(12) United States Patent
Liu

(10) Patent No.: US 12,382,546 B2
(45) Date of Patent: Aug. 5, 2025

(54) MULTICAST SERVICE RECEIVING METHOD, MULTICAST SERVICE CONFIGURATION METHOD, TERMINAL, AND NETWORK-SIDE DEVICE

(71) Applicant: VIVO MOBILE COMMUNICATION CO., LTD., Guangdong (CN)

(72) Inventor: Jiamin Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 373 days.

(21) Appl. No.: 18/101,283

(22) Filed: Jan. 25, 2023

(65) Prior Publication Data

US 2023/0171844 A1 Jun. 1, 2023

Related U.S. Application Data

(63) Continuation of application No. PCT/CN2021/110510, filed on Aug. 4, 2021.

(30) Foreign Application Priority Data

Aug. 5, 2020 (CN) .......................... 202010780254.5

(51) Int. Cl.
*H04W 76/40* (2018.01)
*H04L 1/1829* (2023.01)

(52) U.S. Cl.
CPC ........... *H04W 76/40* (2018.02); *H04L 1/1864* (2013.01)

(58) Field of Classification Search
CPC .............................. H04W 76/40; H04L 1/1864
USPC ........................................................ 370/312
See application file for complete search history.

(56) References Cited

U.S. PATENT DOCUMENTS

| 11,832,277 B2* | 11/2023 | Byun ............... H04W 76/40 |
| 2005/0270996 A1 | 12/2005 | Yi et al. |
| 2008/0225765 A1 | 9/2008 | Marinier et al. |
| 2009/0086710 A1 | 4/2009 | Ho |
| 2016/0087776 A1 | 3/2016 | Chun et al. |
| 2016/0183221 A1 | 6/2016 | Yi et al. |
| 2017/0041767 A1 | 2/2017 | Vajapeyam et al. |

(Continued)

FOREIGN PATENT DOCUMENTS

| CN | 101588231 A | 11/2009 |
| CN | 101636959 A | 1/2010 |

(Continued)

OTHER PUBLICATIONS

First Office Action for Chinese Application No. 202010780254.5, dated Jun. 29, 2022, 9 Pages.
Samsung "RLC SN based Selective Combining, Operation" 3GPP TSG-RAN WG2 #41, Malaga, Spain, Feb. 2004, R2-040435, 4 Pages.
Second Office Action for Chinese Application No. 202010780254.5, dated Jan. 19, 2023, 8 Pages.

(Continued)

*Primary Examiner* — Peter G Solinsky
(74) *Attorney, Agent, or Firm* — BROOKS KUSHMAN P.C.

(57) ABSTRACT

A multicast service receiving method, a multicast service configuration method, a terminal, and a network-side device are disclosed. The multicast service receiving method includes: receiving configuration information of an MBS service sent by a network-side device, where the configuration information of the MBS service includes information for determining whether to enable reordering for a PDCP layer and/or an RLC layer; and receiving the MBS service based on the configuration information of the MBS service.

20 Claims, 6 Drawing Sheets

Receive configuration information of an MBS service sent by a network-side device, where the configuration information of the MBS service includes information for determining whether to enable reordering for a PDCP layer and/or an RLC layer — 31

Receive the MBS service based on the configuration information of the MBS service — 32

(56) References Cited

U.S. PATENT DOCUMENTS

| | | | |
|---|---|---|---|
| 2017/0064679 | A1 | 3/2017 | Zhang et al. |
| 2019/0044880 | A1 | 2/2019 | Yi et al. |
| 2021/0099554 | A1 | 4/2021 | Liu et al. |
| 2021/0126745 | A1* | 4/2021 | Kadiri .................. H04L 1/1832 |
| 2021/0274380 | A1* | 9/2021 | Balasubramanian ....................... H04W 28/0278 |
| 2021/0392467 | A1* | 12/2021 | Kim ....................... H04W 76/40 |
| 2021/0409158 | A1* | 12/2021 | Kanamarlapudi .... H04L 1/1861 |
| 2023/0171566 | A1* | 6/2023 | Wang ....................... H04W 4/06 370/312 |
| 2023/0209313 | A1* | 6/2023 | Chin ........................ H04W 4/06 370/329 |
| 2023/0269758 | A1* | 8/2023 | Wu ....................... H04W 72/23 370/312 |

FOREIGN PATENT DOCUMENTS

| | | |
|---|---|---|
| CN | 101810025 A | 8/2010 |
| CN | 105264830 A | 1/2016 |
| CN | 107079005 A | 8/2017 |
| CN | 107592329 A | 1/2018 |
| CN | 107852768 A | 3/2018 |
| CN | 108401479 A | 8/2018 |
| CN | 109845318 A | 6/2019 |
| EP | 1756999 B1 | 4/2015 |
| WO | 2015168951 A1 | 11/2015 |
| WO | 2018094252 A1 | 5/2018 |

OTHER PUBLICATIONS

International Search Report and Written Opinion for Application No. PCT /CN2021/110510, dated Oct. 28, 2021, 8 Pages.

Extended European Search Report for Application No. 21852827.1, dated Dec. 20, 2023, 7 Pages.

First Office Action for Japanese Application No. 2023-507821, dated Nov. 20, 2023, 5 Pages.

3GPP "3rd Generation Partnership Project; Technical Specification Group Radio Access Network; NR; Packet Data Convergence Protocol (PDCP) specification (Release 16)" 3GPP TS 38.323 V16.1.0, Jul. 2020, 40 Pages.

CMCC "Reordering function in PDCP and RLC" 3GPP TSG-RAN WG2 NR Ad Hoc, Spokane, USA, Jan. 2017, R2-1700533, 3 Pages.

Sequans Communications "PDCP reordering operation" 3GPP TSG-RAN WG2 NR AdHoc, Qingdao, China, Jun. 2017, R2-1707401, 7 Pages.

Sequans Communications "Reordering timer for PDCP operation with (DL) duplication" 3GPP TSG-RAN WG2#101bis, Sanya, China, Apr. 2018, R2-1805954, 3 Pages.

Vivo "Dynamic PTM PTP switch for RRC Connected UE" 3GPP TSG-RAN WG2 Meeting #111 electronic, E-Meeting, Aug. 2020, R2-2007034, 7 Pages.

Huawei, HiSilicon "WID revision: NR Multicast and Broadcast Services" 3GPP TSG RAN Meeting #88-e, E-meeting, Jun. 2020, RP-201038, 6 Pages.

\* cited by examiner

Synchronous communication: data synchronization protocol, used to generate a specific radio frame

MULTICAST SERVICE RECEIVING METHOD, MULTICAST SERVICE CONFIGURATION METHOD, TERMINAL, AND NETWORK-SIDE DEVICE

CROSS-REFERENCE TO RELATED APPLICATIONS

This application is a continuation of PCT International Application No. PCT/CN2021/110510 filed on Aug. 4, 2021, which claims priority to Chinese Patent Application No. 202010780254.5, filed on Aug. 5, 2020, which are incorporated herein by reference in their entireties.

TECHNICAL FIELD

This application pertains to the field of wireless communications technologies, and specifically relates to a multicast service receiving method, a multicast service configuration method, a terminal, and a network-side device.

BACKGROUND

In a long term evolution (LTE) system, a multicast broadcast service (Multicast and Broadcast Service, MBS) is transmitted in an unacknowledged mode (UM). In addition, a sender of the MBS does not support hybrid automatic repeat request (HARQ) retransmission, and this means that data packets arrive in order definitely and that a receiver of the MBS does not perform any reordering operation. Therefore, there is no packet data convergence protocol (PDCP) layer for performing a reordering operation in a layer 2 (L2) protocol stack of the receiver, and there is only a radio link control (RLC) layer.

In a new radio (NR) system, a supported MBS has features different from those in LTE. For example, some MBSs need to support certain transmission reliability, and HARQ feedback and retransmission mechanisms may be required. This causes arrival of data packets of an MBS out of order and causes a problem that a receiver cannot receive the MBS correctly.

SUMMARY

According to a first aspect, a multicast service receiving method is provided and applied to a terminal, where the method includes:
receiving configuration information of an MBS service sent by a network-side device, where the configuration information of the MBS service includes information for determining whether to enable reordering for a PDCP layer and/or an RLC layer; and receiving the MBS service based on the configuration information of the MBS service.

According to a second aspect, a multicast service configuration method is provided and applied to a network-side device, where the method includes:
sending configuration information of an MBS service to a terminal, where the configuration information of the MBS service includes information for determining whether to enable reordering for a PDCP layer and/or an RLC layer.

According to a third aspect, a multicast service receiving apparatus is provided and includes:
a first receiving module, configured to receive configuration information of an MBS service sent by a network-side device, where the configuration information of the MBS service includes information for determining whether to enable reordering for a PDCP layer and/or an RLC layer; and
a second receiving module, configured to receive the MBS service based on the configuration information of the MBS service.

Optionally, the information for determining whether to enable reordering for the PDCP layer and/or the RLC layer includes at least one of the following:
a configuration parameter of the PDCP layer, where the configuration parameter of the PDCP layer includes at least one of the following: whether the PDCP layer is required; whether to enable reordering for the PDCP layer; or a reordering parameter of the PDCP layer; or
a configuration parameter of the RLC layer, where the configuration parameter of the RLC layer includes at least one of the following: whether to enable reordering for the RLC layer; or a reordering parameter of the RLC layer.

Optionally, the multicast service receiving apparatus further includes:
a first execution module, configured to: if the configuration parameter of the PDCP layer includes the reordering parameter of the PDCP layer, perform at least one of the following: determining to enable reordering for the PDCP layer; determining to enable reordering for the RLC layer; if the reordering parameter of the PDCP layer is configured, using the configured reordering parameter, or if the reordering parameter of the PDCP layer is not configured, using a default value; or using a default value for the reordering parameter of the RLC layer, where the configured reordering parameter of the PDCP layer includes at least one of the following: a reordering window, a reordering timer, or a sequence number SN space size; or if the configuration parameter of the PDCP layer does not include the reordering parameter of the PDCP layer, perform at least one of the following: determining to disable reordering for the PDCP layer; or determining to disable reordering for the RLC layer.

Optionally, the multicast service receiving apparatus further includes:
a second execution module, configured to: if the configuration parameter of the RLC layer includes the reordering parameter of the RLC layer, perform at least one of the following: determining to enable reordering for the PDCP layer; determining to enable reordering for the RLC layer; if the reordering parameter of the RLC layer is configured, using the configured reordering parameter, or if the reordering parameter of the RLC layer is not configured, using a default value; or using a default value for the reordering parameter of the PDCP layer, where the configured reordering parameter of the RLC layer includes at least one of the following: a reordering window, a reordering timer, or an SN space size; or if the configuration parameter of the RLC layer does not include the reordering parameter of the RLC layer, perform at least one of the following: determining to disable reordering for the PDCP layer; or determining to disable reordering for the RLC layer.

Optionally, the multicast service receiving apparatus further includes:
a third execution module, configured to perform one of the following:
if the configuration information of the MBS service includes a group of configuration parameters of the PDCP layer or a group of configuration parameters of the RLC layer, and the group of configuration parameters indicates that reordering is to be enabled, determining to enable reordering for both the PDCP layer and the RLC layer;

if the configuration information of the MBS service includes a group of configuration parameters of the PDCP layer or a group of configuration parameters of the RLC layer, and the group of configuration parameters indicates that reordering is to be disabled, determining to disable reordering for both the PDCP layer and the RLC layer; or if the configuration information of the MBS service includes a group of configuration parameters of the PDCP layer or a group of configuration parameters of the RLC layer, determining to use the group of configuration parameters for one of the PDCP layer and the RLC layer and use default configuration parameters for the other.

Optionally, the information for determining whether to enable reordering for the PDCP layer and/or the RLC layer includes:

indication information, used to indicate whether to enable reordering for the PDCP layer and/or the RLC layer.

Optionally, the multicast service receiving apparatus further includes:

a fourth execution module, configured to perform one of the following:

if the indication information indicates that reordering is to be disabled, using a first group of default configuration parameters for the PDCP layer and/or the RLC layer, where the first group of default configuration parameters includes at least one of the following: a reordering window size is 0 or a reordering timer length is 0;

if the indication information indicates that reordering is to be enabled, using a second group of default configuration parameters for the PDCP layer and/or the RLC layer, where the second group of default configuration parameters includes at least one of the following: a reordering window size is N1 and a reordering timer length is m1, where both N1 and m1 are non-zero positive values; or if the indication information indicates that reordering is to be enabled, using a third group of default configuration parameters for the PDCP layer, and using a fourth group of default configuration parameters for the RLC layer, where the third group of default configuration parameters includes at least one of the following: a reordering window size is N2 or a reordering timer length is m2, and the fourth group of default configuration parameters includes at least one of the following: a reordering window size is N3 or a reordering timer length is m3, where N2, m2, N3, and m3 are all non-zero positive values.

Optionally, the information for determining whether to enable reordering for the PDCP layer and/or the RLC layer includes:

first configuration information, used to implicitly indicate whether to enable reordering for the PDCP layer and/or the RLC layer, where the first configuration information includes at least one of the following: a HARQ feedback configuration parameter, a QoS related parameter, a block error rate, or whether to enable an in-order delivery function for a service layer; and the HARQ feedback configuration parameter includes at least one of the following: whether the MBS service requires a HARQ feedback; or a parameter used for the HARQ feedback.

Optionally, the first configuration information includes the HARQ feedback configuration parameter; and the multicast service receiving apparatus further includes:

a fifth execution module, configured to perform one of the following:

if the MBS service does not require the HARQ feedback, determining at least one of the following: not requiring the PDCP layer; disabling reordering for the PDCP layer; disabling reordering for the RLC layer; or using a first group of default configuration parameters for the PDCP layer and/or the RLC layer, where the first group of default configuration parameters includes at least one of the following: a reordering window size is 0 or a reordering timer length is 0;

if the MBS service requires the HARQ feedback, determining at least one of the following: requiring the PDCP layer; enabling reordering for the PDCP layer; enabling reordering for the RLC layer; and using a second group of default configuration parameters for the PDCP layer and/or the RLC layer, where the second group of default configuration parameters includes at least one of the following: a reordering window size is N1 or a reordering timer length is m1, where both N1 and m1 are non-zero positive values;

if the MBS service requires the HARQ feedback, determining at least one of the following: requiring the PDCP layer; enabling reordering for the PDCP layer; enabling reordering for the RLC layer; or using a third group of default configuration parameters for the PDCP layer and using a fourth group of default configuration parameters for the RLC layer, where the third group of default configuration parameters includes at least one of the following: a reordering window size is N2 or a reordering timer length is m2, and the fourth group of default configuration parameters includes at least one of the following: a reordering window size is N3 or a reordering timer length is m3, where N2, m2, N3, and m3 are all non-zero positive values;

if the MBS service requires the HARQ feedback, and only one HARQ process is configured for the MBS service, or the network-side device explicitly or implicitly indicates that MBS data packets are not out of order, determining at least one of the following: not requiring the PDCP layer; disabling reordering for the PDCP layer; disabling reordering for the RLC layer; or using a first group of default configuration parameters for the PDCP layer and/or the RLC layer, where the first group of default configuration parameters includes at least one of the following: a reordering window size is 0 or a reordering timer length is 0;

if the MBS service requires the HARQ feedback, and a plurality of HARQ processes are configured for the MBS service, or the network-side device explicitly or implicitly indicates that MBS data packets are out of order, determining at least one of the following: requiring the PDCP layer; enabling reordering for the PDCP layer; enabling reordering for the RLC layer; or using a second group of default configuration parameters for the PDCP layer and/or the RLC layer, where the second group of default configuration parameters includes at least one of the following: a reordering window size is N1 or a reordering timer length is m1, where both N1 and m1 are non-zero positive values; or if the MBS service requires the HARQ feedback, and a plurality of HARQ processes are configured for the MBS service, or the network-side device explicitly or implicitly indicates that MBS data packets are out of order, determining at least one of the following: requiring the PDCP layer; enabling reordering for the PDCP layer; enabling reordering for the RLC layer; or using a third group of default configuration parameters for the PDCP layer and using a fourth group of default configuration parameters for the RLC layer, where the third group of default configuration parameters includes at least one of the following: a reordering window size is N2 or a reordering timer length is m2, and the fourth group of default configuration parameters includes at least one of the following: a reordering window size is N3 or a reordering timer length is m3, where N2, m2, N3, and m3 are all non-zero positive values.

Optionally, the multicast service receiving apparatus further includes:
a sixth execution module, configured to perform one of the following:
not establishing the PDCP layer;
establishing the PDCP layer for which reordering is disabled; or
establishing the PDCP layer for which reordering is enabled.

Optionally, the establishing the PDCP layer for which reordering is disabled includes at least one of the following:
setting initial values of all SN-related variables of the PDCP layer to 0, where the variable includes at least one of the following: RX_NEXT, RX_DELIV, and RX_REORD;
setting a length of a reordering timer of the PDCP layer to 0; or
setting a size of a reordering window of the PDCP layer to 0.

Optionally, the establishing the PDCP layer for which reordering is enabled includes at least one of the following:
initializing an SN-related variable of the PDCP layer, where an initial value of the SN-related variable of the PDCP layer is calculated based on an SN of a first received data packet, and the variable includes at least one of the following: RX_NEXT, RX_DELIV, or RX_REORD;
setting a length of a reordering timer of the PDCP layer to a non-zero positive value, where the non-zero positive value is configured by the configuration information of the MBS service or prescribed in a protocol; or
setting a size of a reordering window of the PDCP layer to a non-zero positive value, where the non-zero positive value is configured by the configuration information of the MBS service or prescribed in a protocol.

Optionally, an SN part of an initial value of RX_NEXT is equal to the SN of the first received data packet or SN+1 modulo SN space size, and an HFN part needs to ensure that RX NEXT is positive;
an SN part of an initial value of RX_DELIV is equal to (SN of the first received data packet−0.5*reordering window size) modulo SN space size, and an HFN part needs to ensure that a count value is positive; and
an initial value of RX_REORD is 0.

Optionally, the multicast service receiving apparatus further includes:
a seventh execution module, configured to perform one of the following:
establishing the RLC layer for which reordering is enabled; or
establishing the RLC layer for which reordering is disabled.

Optionally, the establishing the RLC layer for which reordering is enabled includes at least one of the following:
initializing an SN-related variable of the RLC layer, where an initial value of the SN-related variable of the RLC layer is calculated based on an RLC SN of a first received data packet, and the variable includes at least one of the following: RX_Next_Reassembly, RX_Timer_Trigger, or RX_Next_Highest;
setting a length of a reordering timer of the RLC layer to a non-zero positive value, where the non-zero positive value is configured by the configuration information of the MBS service or prescribed in a protocol; or
setting a size of a reordering window of the RLC layer to a non-zero positive value, where the non-zero positive value is configured by the configuration information of the MBS service or prescribed in a protocol.

Optionally, an initial value of RX_Next_Reassembly is set to the SN of the first received RLC PDU or SN+1 modulo SN space size;
an initial value of RX_Timer_Trigger is set to 0; or
an initial value of RX_Next_Highest is set to the SN of the first received RLC PDU or SN+1 modulo SN space size.

Optionally, the establishing the RLC layer for which reordering is disabled includes at least one of the following:
setting initial values of all SN-related variables of the RLC layer to 0, where the variable includes at least one of the following: RX_Next_Reassembly, RX_Timer_Trigger, or RX_Next_Highest;
setting a length of a reordering timer of the RLC layer to 0; or
setting a size of a reordering window of the RLC layer to 0.

Optionally, the second receiving module is configured to: if reordering is configured as disabled for the PDCP layer, for each received data packet, directly obtain an SDU through parsing and then deliver the SDU to a higher layer, and directly set an SN part of a variable RX_NEXT or RX_DELIV of the PDCP layer to an SN of the received data packet or SN+1, and set an HFN part to 0 or any other arbitrary or prescribed value that ensures that a count value is positive.

Optionally, an MRB or a DRB is used to carry the MBS service.

Optionally, the multicast service receiving apparatus further includes:
an eighth execution module, configured to: if switching from an MRB to a DRB is required, receive configuration information of the MBS service of the DRB, and establish a new PDCP layer and/or RLC layer for the DRB based on the configuration information of the MBS service of the DRB; or if switching from an MRB to a DRB is required, use a PDCP layer configuration and/or an RLC configuration of the MRB for the DRB.

Optionally, the multicast service receiving apparatus further includes:
a ninth execution module, configured to: if switching from a DRB to an MRB is required, receive configuration information of the MBS service of the MRB, and establish a new PDCP layer and/or RLC layer for the MRB based on the configuration information of the MBS service of the MRB; or if switching from a DRB to an MRB is required, use a PDCP layer configuration and/or an RLC configuration of the DRB for the MRB.

Optionally, the configuration information of the MBS service of the MRB is configured in at least one of the following modes:
- a system information block, system information, or a broadcast mode; or
- dedicated signaling.

According to a fourth aspect, a multicast service configuration apparatus is provided and includes:
- a sending module, configured to send configuration information of an MBS service to a terminal, where the configuration information of the MBS service includes information for determining whether to enable reordering for a PDCP layer and/or an RLC layer.

Optionally, the sending module is configured to send the configuration information of the MBS service to the terminal in at least one of the following modes:
- a system information block, system information, or a broadcast mode;
- dedicated signaling; or
- preconfiguration information.

Optionally, the information for determining whether to enable reordering for the PDCP layer and/or the RLC layer includes at least one of the following:
- a configuration parameter of the PDCP layer, where the configuration parameter of the PDCP layer includes at least one of the following: whether the PDCP layer is required; whether to enable reordering for the PDCP layer; or a reordering parameter of the PDCP layer; or
- a configuration parameter of the RLC layer, where the configuration parameter of the RLC layer includes at least one of the following: whether to enable reordering for the RLC layer; or a reordering parameter of the RLC layer.

Optionally, the information for determining whether to enable reordering for the PDCP layer and/or the RLC layer includes:
- indication information, used to indicate whether to enable reordering for the PDCP layer and/or the RLC layer.

Optionally, the information for determining whether to enable reordering for the PDCP layer and/or the RLC layer includes:
- first configuration information, used to implicitly indicate determining whether to enable reordering for the PDCP layer and/or the RLC layer, where
- the first configuration information includes at least one of the following: a HARQ feedback configuration parameter, a QoS related parameter, a block error rate, or whether to enable an in-order delivery function for a service layer; and
- the HARQ feedback configuration parameter includes at least one of the following: whether the MBS service requires a HARQ feedback; or a parameter used for the HARQ feedback.

According to a fifth aspect, a terminal is provided, where the terminal includes a processor, a memory, and a program or instructions stored in the memory and capable of running on the processor, where when the program or instructions are executed by the processor, the steps of the method according to the first aspect are implemented.

According to a sixth aspect, a network-side device is provided, where the network-side device includes a processor, a memory, and a program or instructions stored in the memory and capable of running on the processor, where when the program or instructions are executed by the processor, the step of the method according to the second aspect is implemented.

According to a seventh aspect, a readable storage medium is provided, where the readable storage medium stores a program or instructions, and when the program or instructions are executed by a processor, the steps of the method according to the first aspect are implemented, or the step of the method according to the second aspect is implemented.

According to an eighth aspect, a chip is provided, where the chip includes a processor and a communications interface, the communications interface is coupled to the processor, and the processor is configured to run a program or instructions on a network-side device to implement the method according to the first aspect or implement the method according to the second aspect.

According to a ninth aspect, a program product is provided, where the program product is stored in a non-volatile storage medium, and the program product is executed by at least one processor to implement the method according to the first aspect or implement the method according to the second aspect.

DETAILED DESCRIPTION

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that the terms used in this way are interchangeable in appropriate circumstances, so that the embodiments of this application can be implemented in other orders than the order illustrated or described herein. In addition, objects distinguished by "first" and "second" usually fall within one class, and a quantity of objects is not limited. For example, there may be one or more first objects. In addition, the term "and/or" in the specification and claims indicates at least one of connected objects, and the character "/" generally represents an "or" relationship between associated objects.

It should be noted that technologies described in the embodiments of this application are not limited to a long time evolution (LTE)/LTE-Advanced (LTE-A) system, and can also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The described technologies may be used for the foregoing systems and radio technologies, and may also be used for other systems and radio technologies. However, in the following descriptions, a new radio (NR) system is described for an illustration purpose, and NR terms are used in most of the following descriptions, although these technologies may also be applied to other applications than an NR system application, for example, a 6th generation (6G) communications system.

Figure 1:
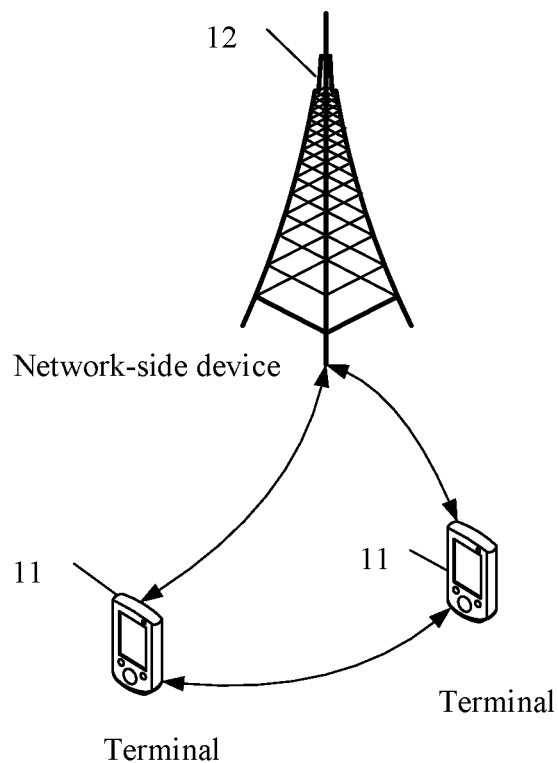
FIG. 1 is a schematic diagram of a wireless communications system to which an embodiment of this application can be applied.

FIG. 1 is a schematic diagram of a wireless communications system to which an embodiment of this application may be applied. The wireless communications system includes a terminal 11 and a network-side device 12. The terminal 11 may also be referred to as a terminal device or a user terminal (User Equipment, UE). The terminal 11 may be a terminal-side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device, a vehicular device (VUE), or a pedestrian terminal (PUE). The wearable device includes a hand ring, an earphone, glasses, or the like. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a home NodeB, a home evolved NodeB, a WLAN access point, a Wi-Fi node, a transmission and reception point (Transmitting Receiving Point, TRP), or another appropriate term in the art, as long as the same technical effect is achieved. The base station is not limited to specific technical terms. It should be noted that in the embodiments of this application, only a base station in an NR system is used as an example, but a specific type of the base station is not limited.

A multicast service receiving method, a multicast service configuration method, a terminal, and a network-side device provided in the embodiments of this application are hereinafter described in detail by using specific embodiments and application scenarios thereof with reference to the accompanying drawings.

In the LTE system, a multicast broadcast service (Multicast and Broadcast Service, MBS) or multimedia multicast broadcast service (MBMS) can be sent in an MBMS single frequency network (Multimedia Broadcast multicast service Single Frequency Network, MBSFN) mode and sent in a single cell point to multipoint (SC-PTM) mode. In the MBSFN mode, cells in a same MBSFN area synchronously send a same broadcast service, so that user equipment (UE, also referred to as a terminal) receives the service conveniently. Control information (control channel parameters, traffic channel parameters, scheduling information, and the like) and data information of the MBMS service are all sent in a broadcast mode, so that both UE in an idle state and UE in a connected state can receive the MBMS service. A greatest difference between the SC-PTM mode and the MBSFN mode is that scheduling and sending are performed only in a single cell and that service scheduling is performed by using a g-RNTI (group RNTI). The control channel parameters, a service identity, period information, and the like are broadcast in a broadcast message. The scheduling information is notified by using a physical downlink control channel (PDCCH) scrambled by the g-RNTI. A data part is sent in a multicast mode. This means that interested UE listens to the g-RNTI to obtain data scheduling and then perform reception.

Figure 2:
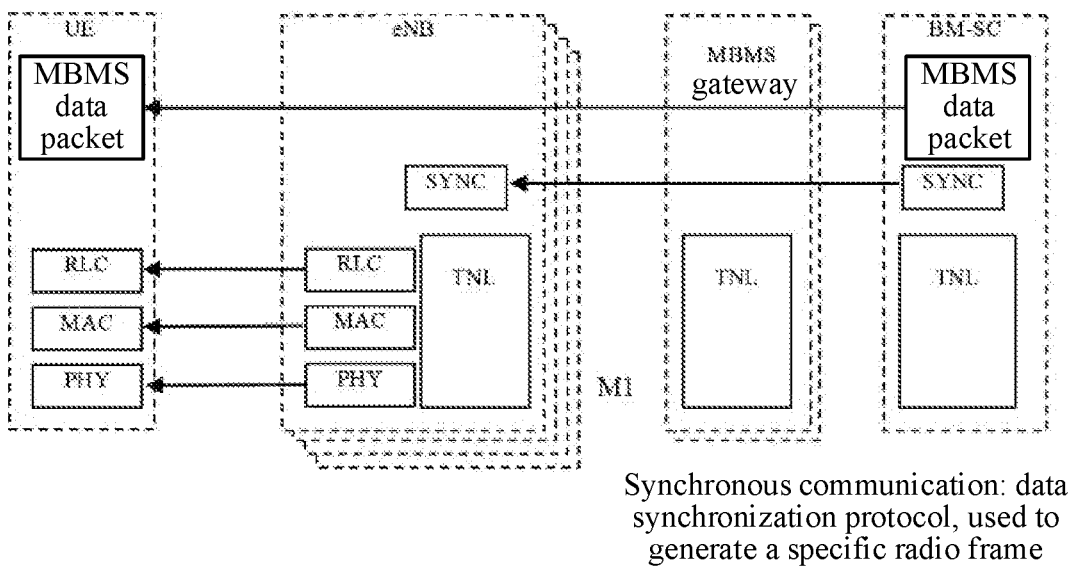
FIG. 2 is a schematic diagram of an architecture of an LTE MBMS user plane protocol stack.

FIG. 2 is a schematic diagram of an architecture of an LTE MBMS user plane protocol stack. It can be seen from FIG. 2 that there is no PDCP layer in an L2 protocol stack of an LTE multicast service and that there is only an RLC layer. Enhancements made at the RLC layer for the multicast service mainly include introduction of a corresponding logical channel, a multicast traffic channel (MTCH), and a multicast control channel (MCCH), and subsequent addition of a single cell multicast traffic channel (SC-MTCH), and a single cell multicast control channel (SC-MCCH). In addition, for reception of the MTCH, MCCH, SC-MTCH, and SC-MCCH, it is clearly indicated that no reordering operation is performed, and a reordering window UM_Window_Size is equal to 0.

Both the LTE MBMS transmission mode and the SC-PTM transmission mode use an unacknowledged mode (UM) for transmission. In addition, a sender does not support any hybrid automatic repeat request (HARQ) retransmission. This means that data packets arrive in order definitely and that a receiver does not perform any reordering operation, where a reordering window size is 0. When the UE is interested in the multicast service, an RLC entity of the MTCH (media access control (MAC) and a physical layer (PHY) are configured accordingly) is established for reception. When the UE is not interested in the multicast service, the corresponding RLC entity is released. For sending in the MBSFN mode, because all base stations in a specific area perform sending synchronously, when the UE moves between cells, the RLC entity for receiving the MTCH does not need to be reestablished or reset. However, because an SC-PTM service is sent by a single cell, even if its neighboring cells support the same SC-PTM service, the SC-PTM service is sent independently. Therefore, when the UE is handed over between cells, the UE releases an RLC entity corresponding to an old SC-MTCH and establishes an RLC entity of a new SC-MTCH for multicast service reception in a new cell.

Considering that functions of an NR L2 protocol stack are adjusted in comparison with those in LTE, and typically a data packet reordering function is migrated from an RLC layer to a PDCP layer, an L2 protocol stack for receiving an NR MBS service may need to support the PDCP layer protocol. These differences mean that an L2 (mainly the RLC and PDCP layers) behavior for receiving an MBS in NR needs to be redesigned and cannot be the same as that in LTE; otherwise, a receiving error is caused, and an unnecessary packet loss and user experience degradation are caused.

Figure 3:
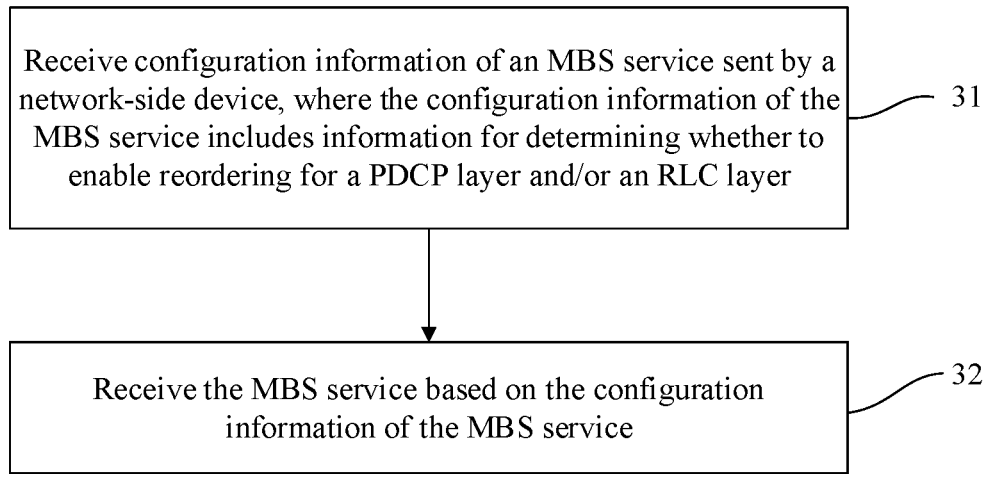
FIG. 3 is a schematic flowchart of a multicast service receiving method according to an embodiment of this application.

To resolve the foregoing problem, referring to FIG. 3, an embodiment of this application provides a multicast service receiving method. The method is applied to a terminal and includes the following steps.

Step 31: Receive configuration information of an MBS service sent by a network-side device, where the configuration information of the MBS service includes information for determining whether to enable reordering for a PDCP layer and/or an RLC layer.

In this embodiment of this application, optionally, each MBS service corresponds to its own configuration information.

Step 32: Receive the MBS service based on the configuration information of the MBS service.

In this embodiment of this application, the terminal can separately perform, based on network-side configurations, different operations on an MBS service that requires out-of-order processing and an MBS service that does not require out-of-order processing, to receive the services correctly and ensure MBS service experience of the terminal and system efficiency.

The information for determining whether to enable reordering for the PDCP layer and/or the RLC layer in the configuration information of the MBS service may be in various forms. The following uses examples for description.

(I) In some embodiments of this application, optionally, the information for determining whether to enable reordering for the PDCP layer and/or the RLC layer includes at least one of the following:

a configuration parameter of the PDCP layer, where the configuration parameter of the PDCP layer includes at least one of the following: whether the PDCP layer is required; whether to enable reordering for the PDCP layer; or a reordering parameter of the PDCP layer; or a configuration parameter of the RLC layer, where the configuration parameter of the RLC layer includes at least one of the following: whether to enable reordering for the RLC layer; or a reordering parameter of the RLC layer.

It should be noted that the PDCP layer does not always exist for MBS-related RBs. The PDCP layer may exist for some MBS services, and may not exist for some MBS services. However, the RLC layer always exists for all MBS-related RBs. A difference lies in that operations performed are different, for example, whether reordering is enabled.

The reordering parameter of the PDCP layer may include at least one of the following: a reordering window, a reordering timer, or an SN space size.

The reordering parameter of the RLC layer may include at least one of the following: a reordering window, a reordering timer, or an SN space size.

In this embodiment of this application, the reordering window, the reordering timer, and the SN space size may be all configured by the network side, or all prescribed in a protocol, or partially set by the network side and partially prescribed in a protocol. For example, the reordering timer is configured by the network side, the SN space size is prescribed in a protocol, and the reordering window is prescribed as half of the SN space size. For another example, the SN space size is configured by the network side, and the reordering window is prescribed as half of the SN space size.

In this embodiment of this application, whether to enable reordering for the PDCP layer may be directly indicated in the configuration parameter of the PDCP layer, or may not be directly indicated in the configuration parameter of the PDCP layer; instead, whether to enable reordering for the PDCP layer is indicated by whether the reordering parameter of the PDCP layer is configured. For example, if the reordering window is configured in the reordering parameter of the PDCP layer, it is determined to enable reordering for the PDCP layer. For another example, if the SN space size is configured in the reordering parameter of the PDCP layer, it is determined to enable reordering for the PDCP layer.

To be specific, the method further includes:

if the configuration parameter of the PDCP layer includes the reordering parameter of the PDCP layer, performing at least one of the following: determining to enable reordering for the PDCP layer; determining to enable reordering for the RLC layer; if the reordering parameter of the PDCP layer is configured, using the configured reordering parameter, or if the reordering parameter of the PDCP layer is not configured, using a default value; or using a default value for the reordering parameter of the RLC layer, where the configured reordering parameter of the PDCP layer includes at least one of the following: the reordering window, the reordering timer, or the sequence number SN space size; or if the configuration parameter of the PDCP layer does not include the reordering parameter of the PDCP layer, performing at least one of the following: determining to disable reordering for the PDCP layer; or determining to disable reordering for the RLC layer.

In this embodiment of this application, whether to enable reordering for the RLC layer may be directly indicated in the configuration parameter of the RLC layer, or may not be directly indicated in the configuration parameter of the RLC layer; instead, whether to enable reordering for the RLC layer is indicated by whether the reordering parameter of the RLC layer is configured. For example, if the reordering window is configured in the reordering parameter of the RLC layer, it is determined to enable reordering for the RLC layer. For another example, if the SN space size is configured in the reordering parameter of the RLC layer, it is determined to enable reordering for the RLC layer.

To be specific, the method includes:

if the configuration parameter of the RLC layer includes the reordering parameter of the RLC layer, performing at least one of the following: determining to enable reordering for the PDCP layer; determining to enable reordering for the RLC layer; if the reordering parameter of the RLC layer is configured, using the configured reordering parameter, or if the reordering parameter of the RLC layer is not configured, using a default value; or using a default value for the reordering parameter of the PDCP layer, where the configured reordering parameter of the RLC layer includes at least one of the following: the reordering window, the reordering timer, or the SN space size; or if the configuration parameter of the RLC layer does not include the reordering parameter of the RLC layer, determining to disable reordering for the RLC layer.

Further optionally, the configuration information of the MBS service includes both the configuration parameter of the PDCP layer and the configuration parameter of the RLC layer, and reordering is configured as enabled for both the PDCP layer and the RLC layer, or reordering is configured as disabled for both the PDCP layer and the RLC layer.

In some embodiments of this application, if the configuration information of the MBS service does not explicitly or implicitly indicate whether the PDCP layer is required, whether the PDCP layer is required is prescribed in a protocol, and the PDCP layer may be required by default.

For example, regardless of a radio bearer (RB) type, to unify protocol stacks, an NR MBS requires a PDCP layer, but different operations (for example, whether reordering is required) are performed.

In some embodiments of this application, the receiving the MBS service based on the configuration information of the MBS service includes one of the following:

if the configuration information of the MBS service includes a group of configuration parameters of the PDCP layer or a group of configuration parameters of the RLC layer, and the group of configuration parameters indicates that reordering is to be enabled, determining to enable reordering for both the PDCP layer and the RLC layer;

if the configuration information of the MBS service includes a group of configuration parameters of the PDCP layer or a group of configuration parameters of the RLC layer, and the group of configuration parameters indicates that reordering is to be disabled, determining to disable reordering for both the PDCP layer and the RLC layer; or if the configuration information of the MBS service includes a group of configuration parameters of the PDCP layer or a group of configuration parameters of the RLC layer, determining to use the group of configuration parameters for one of the PDCP layer and the RLC layer and use default configuration parameters for the other. For example, if the configuration information of the MBS service includes configuration parameters of the PDCP layer, it is determined that the PDCP layer uses the group of configuration parameters and that the RLC layer uses default configuration parameters; or if the configuration information of the MBS service includes configuration parameters of the RLC layer, it is determined that the RLC layer uses the group of configuration parameters and that the PDCP layer uses default configuration parameters.

In this embodiment of this application, the configuration information of the MBS service may further include other L2 layer configurations. Details are not described herein.

In this embodiment of this application, the configuration information of the MBS service may further include configurations of other layers (such as a MAC layer). Details are not described herein.

(II) In some embodiments of this application, the information for determining whether to enable reordering for the PDCP layer and/or the RLC layer includes: indication information, used to indicate whether to enable reordering for the PDCP layer and/or the RLC layer. The indication information may be represented by one bit.

In other words, the indication information is used to explicitly indicate whether to enable reordering for the PDCP layer and/or the RLC layer.

Optionally, the receiving the MBS service based on the configuration information of the MBS service includes one of the following:

if the indication information indicates that reordering is to be disabled, using a first group of default configuration parameters for the PDCP layer and/or the RLC layer, where the first group of default configuration parameters includes at least one of the following: a reordering window size is 0 or a reordering timer length is 0;

if the indication information indicates that reordering is to be enabled, using a second group of default configuration parameters for the PDCP layer and/or the RLC layer, where the second group of default configuration parameters includes at least one of the following: a reordering window size is N1 or a reordering timer length is m1, where both N1 and m1 are non-zero positive values; or if the indication information indicates that reordering is to be enabled, using a third group of default configuration parameters for the PDCP layer, and using a fourth group of default configuration parameters for the RLC layer, where the third group of default configuration parameters includes at least one of the following: a reordering window size is N2 or a reordering timer length is m2, and the fourth group of default configuration parameters includes at least one of the following: a reordering window size is N3 or a reordering timer length is m3, where N2, m2, N3, and m3 are all non-zero positive values.

For each MBS service, the foregoing (I) and (II) are intended to explicitly indicate whether to enable reordering for the PDCP layer and/or the RLC layer. Certainly, whether to enable reordering for the PDCP layer and/or the RLC layer may alternatively be implicitly indicated.

(III) In some embodiments of this application, the information for determining whether to enable reordering for the PDCP layer and/or the RLC layer includes: first configuration information, used to implicitly indicate whether to enable reordering for the PDCP layer and/or the RLC layer.

Optionally, the first configuration information includes at least one of the following: a HARQ feedback configuration parameter, a QoS related parameter, a block error rate, or whether to enable an in-order delivery function for a service layer.

Optionally, the HARQ feedback configuration parameter includes at least one of the following: whether the MBS service requires a HARQ feedback; or a parameter used for the HARQ feedback. The parameter used for the HARQ feedback includes, for example, NACK based or ACK/NACK based; whether all UEs perform feedbacks in one time-frequency position or UEs perform feedbacks in a specific position or a group position; HARQ process count reservation and calculation method introduced for supporting the feedback; or the maximum number of retransmissions.

Optionally, the first configuration information includes the HARQ feedback configuration parameter; and the receiving the MBS service based on the configuration information of the MBS service includes one of the following:

(1) If the MBS service does not require the HARQ feedback (disable), determining at least one of the following: not requiring the PDCP layer; disabling reordering for the PDCP layer; disabling reordering for the RLC layer; or using a first group of default configuration parameters for the PDCP layer and/or the RLC layer, where the first group of default configuration parameters includes at least one of the following: a reordering window size is 0 or a reordering timer length is 0.

For example, if the MBS service does not require the HARQ feedback (disable), there is no disorder, and it is determined that the PDCP layer is not required.

For example, if the MBS service does not require the HARQ feedback (disable), there is no disorder, and it is determined that the PDCP layer is required (the PDCP layer may exist for a unified architecture), but reordering does not need to be enabled.

For example, if the MBS service does not require the HARQ feedback (disable), there is no disorder, and it is determined that reordering does not need to be enabled for the RLC layer.

(2) If the MBS service requires the HARQ feedback (enable), determining at least one of the following: requiring the PDCP layer; enabling reordering for the PDCP layer; enabling reordering for the RLC layer; or using a second group of default configuration parameters for the PDCP layer and/or the RLC layer, where the second group of default configuration parameters includes at least one of the following: a reordering window size is N1 or a reordering timer length is m1, where both N1 and m1 are non-zero positive values.

For example, if the MBS service requires the HARQ feedback (enable), it is determined that the PDCP layer is required, and reordering is enabled for the PDCP layer.

For example, if the MBS service requires the HARQ feedback (enable), it is determined that reordering needs to be enabled for the RLC layer.

(3) If the MBS service requires the HARQ feedback, determining at least one of the following: requiring the PDCP layer; enabling reordering for the PDCP layer; enabling reordering for the RLC layer; or using a third group of default configuration parameters for the PDCP layer and using a fourth group of default configuration parameters for the RLC layer, where the third group of default configuration parameters includes at least one of the following: a reordering window size is N2 or a reordering timer length is m2, and the fourth group of default configuration parameters includes at least one of the following: a reordering window size is N3 or a reordering timer length is m3, where N2, m2, N3, and m3 are all non-zero positive values.

The foregoing (1) to (3) are intended to determine, according to whether the MBS service requires the HARQ feedback, whether to enable reordering for the PDCP layer and/or the RLC layer.

In this embodiment of this application, whether to enable reordering for the PDCP layer and/or the RLC layer may also be determined according to whether the MBS service requires the HARQ feedback and other configurations.

(4) If the MBS service requires the HARQ feedback, and only one HARQ process is configured for the MBS service, or the network-side device explicitly or implicitly indicates that MBS data packets are not out of order, determining at least one of the following: not requiring the PDCP layer; disabling reordering for the PDCP layer; disabling reordering for the RLC layer; or using a first group of default configuration parameters for the PDCP layer and/or the RLC layer, where the first group of default configuration parameters includes at least one of the following: a reordering window size is 0 or a reordering timer length is 0.

For example, although the MBS service requires the HARQ feedback, only one HARQ process is configured for the MBS service, or the network-side device explicitly or implicitly indicates that MBS data packets are not out of order. In this case, there is no disorder, and it is determined to disable reordering for the PDCP layer.

(5) If the MBS service requires the HARQ feedback, and a plurality of HARQ processes are configured for the MBS service, or the network-side device explicitly or implicitly indicates that MBS data packets are out of order, determining at least one of the following: requiring the PDCP layer; enabling reordering for the PDCP layer; enabling reordering for the RLC layer; or using a second group of default configuration parameters for the PDCP layer and/or the RLC layer, where the second group of default configuration parameters includes at least one of the following: a reordering window size is N1 or a reordering timer length is m1, where both N1 and m1 are non-zero positive values.

For example, if the MBS service requires the HARQ feedback, and a plurality of HARQ processes are configured for the MBS service, or the network-side device explicitly or implicitly indicates that MBS data packets are out of order, it is determined to enable reordering for the PDCP layer.

(6) If the MBS service requires the HARQ feedback, and a plurality of HARQ processes are configured for the MBS service, or the network-side device explicitly or implicitly indicates that MBS data packets are out of order, determining at least one of the following: requiring the PDCP layer; enabling reordering for the PDCP layer; enabling reordering for the RLC layer; or using a third group of default configuration parameters for the PDCP layer and using a fourth group of default configuration parameters for the RLC layer, where the third group of default configuration parameters includes at least one of the following: a reordering window size is N2 or a reordering timer length is m2, and the fourth group of default configuration parameters includes at least one of the following: a reordering window size is N3 or a reordering timer length is m3, where N2, m2, N3, and m3 are all non-zero positive values.

Whether to enable reordering for the PDCP layer and/or the RLC layer can also be determined based on other configuration information of the MBS service such as the QoS related parameter, the block error rate, and whether to enable the in-order delivery function for the service layer, in addition to the HARQ feedback configuration parameter. For example, when the block error rate is required to be lower than a preset threshold, it is determined to enable reordering for the PDCP layer and/or the RLC layer.

In this embodiment of this application, optionally, in addition to the foregoing content, the configuration information of the MBS service may further include:

an MBS service identity, such as a temporary mobile group identity (Temporary Mobile Group Identity, TMGI);

service information of the MBS service, such as a period, a period offset (offset), a sending period (duration) in the period, or the like; and scheduling and transmission information of the MBS service, such as a g-RNTI (group RNTI), a parameter used for scheduling, a resource parameter, a transmission parameter such as a modulation and coding scheme (MCS) table, or the like.

The terminal obtains the configuration information of the MBS service from the network side. If the terminal is interested in the MBS service, the terminal can establish a related protocol stack based on the configuration on the network side, and perform related initialization and update operations to correctly receive and process the MBS service.

The following describes how to perform an initialization process of the PDCP layer and the RLC layer after the terminal obtains the configuration information of the MBS service.

(I) Initialization of the L2 Layer

Because the PDCP layer and the RLC layer can be configured together or separately, a configuration mode does not affect a final initialization behavior. In this embodiment, initialization behaviors of the two layers are described separately.

(1) Initialization of the PDCP Layer

In this embodiment of this application, optionally, the receiving the MBS service based on the configuration information of the MBS service includes one of the following:

(1) Not Establishing the PDCP Layer.

Main functions of the PDCP layer are to implement functions such as header compression, security, and reordering, for an NR MBS service, and these functions may not be required. Therefore, the entire PDCP layer can be directly removed in this case.

(2) Establishing the PDCP Layer for which Reordering is Disabled.

For an NR MBS service, it is possible that only the header compression function and/or the security function are/is required. In this case, alternatively, the PDCP layer may be established with the reordering function removed.

For an NR MBS service, it is possible that none of the header compression function and the security and reordering functions is required, but to unify the protocol stacks, the PDCP layer can be established to perform transparent transmission or basic functions.

Optionally, the establishing the PDCP layer for which reordering is disabled includes at least one of the following:

setting initial values of all SN-related variables of the PDCP layer to 0, where the variable includes at least one of the following: RX_NEXT, RX_DELIV, or RX_REORD; RX_NEXT is a count or an SN corresponding to a next data packet to be received, RX_DELIV is a count or an SN corresponding to a first data packet delivered out of order to the higher layer, and RX_REORD is a count or an SN corresponding to a data packet that triggers a reordering timer; all the foregoing three variables are not necessarily required, because reordering is disabled; in this case, RX_REORD is not required, and RX_DELIV=RX_NEXT, and therefore one of the two can be selected for initialization and maintenance;

setting a length of a reordering timer of the PDCP layer to 0; or setting a size of a reordering window of the PDCP layer to 0.

In the process of receiving the MBS service at the PDCP layer, it is specified that reordering is not performed.

The count value is fixed to 32 bits, and the SN space size is variable, such as 12 bits or 18 bits. The SN is low bits of the count value, and remaining high bits are referred to as an HFN. This means that the SN forms the low bits of the count value and that the HFN forms the high bits of the count value. When the SN is 12 bits, the 12-bit SN and a 20-bit HFN constitute a complete count value. When the SN is 18 bits, the 18-bit SN and a 14-bit HFN constitute a complete count value.

(3) Establishing the PDCP Layer for which Reordering is Enabled.

Optionally, the establishing the PDCP layer for which reordering is enabled includes at least one of the following:

initializing an SN-related variable of the PDCP layer, where an initial value of the SN-related variable of the PDCP layer is calculated based on an SN of a first received data packet, and the variable includes at least one of the following: RX_NEXT, RX_DELIV, or RX_REORD; RX_NEXT is a count or an SN corresponding to a next data packet to be received, RX_DELIV is a count or an SN corresponding to a first data packet delivered out of order to the higher layer, and RX_REORD is a count or an SN corresponding to a data packet that triggers a reordering timer; optionally, an SN part of the initial value of RX_NEXT is equal to the SN or SN+1 modulo SN space size (such as 4096) of the first received data packet, and a hyperframe number (HFN) part is 0 or 1 (specifically, whether the HFN part is set 0 or 1 depends on a requirement to ensure that RX_DELIV calculated is a positive value); an SN part of an initial value of RX_DELIV is equal to (SN−0.5*reordering window size) modulo SN space size (such as 4096) of the first received data packet, and an HFN part needs to ensure that the count value is positive; for example, assuming that the SN of the received first data packet is 100 and that the window is 2048, (100−0.5*2048) mod 4096=3172; in this case, the HFN of RX_NEXT needs to be at least 1 to ensure that the HFN part of RX_DELIV is at least 0 and not negative; an initial value of RX_REORD is 0; all the foregoing three variables are required, because reordering is enabled and each variable has its own function;

setting a length of a reordering timer of the PDCP layer to a non-zero positive value, where the non-zero positive value is configured by the configuration information of the MBS service or prescribed in a protocol; or setting a size of a reordering window of the PDCP layer to a non-zero positive value, where the non-zero positive value is configured by the configuration information of the MBS service or prescribed in a protocol.

In the process of receiving the MBS service at the PDCP layer, it is specified that reordering is performed.

(2) Initialization of the RLC Layer

In this embodiment of this application, optionally, the receiving the MBS service based on the configuration information of the MBS service includes one of the following:

(1) Establishing the RLC Layer for which Reordering is Enabled.

The establishing the RLC layer for which reordering is enabled includes at least one of the following:

initializing an SN-related variable of the RLC layer, where an initial value of the SN-related variable of the RLC layer is calculated based on an RLC SN of a first received data packet, and the variable includes at least one of the following: RX_Next_Reassembly, RX_Timer_Trigger, or RX_Next_Highest; RX_Next_Reassembly is an SN corresponding to an earliest data packet that is still being reassembled, RX_Timer_Trigger is an SN corresponding to a data packet that triggers a reassembly timer, and RX_Next_Highest is one next to a highest SN delivered to the higher layer; optionally, an initial value of RX_Next_Reassembly is set to the SN of the first received RLC PDU or SN+1 modulo SN space size; an initial value of RX_Timer_Trigger is set to 0; an initial value of RX_Next_Highest is set to the SN of the first received RLC PDU or SN+1 modulo SN space size; all the foregoing three variables are required, because reordering is supported and each variable has its own function;

setting a length of a reordering timer of the RLC layer to a non-zero positive value, where the non-zero positive value is configured by the configuration information of the MBS service or prescribed in a protocol; or setting a size of a reordering window of the RLC layer to a non-zero positive value, where the non-zero positive value is configured by the configuration information of the MBS service or prescribed in a protocol.

In the process of receiving the MBS service at the RLC layer, it is specified that reordering is performed.

(2) Establishing the RLC Layer for which Reordering is Disabled.

Optionally, the establishing the RLC layer for which reordering is disabled includes at least one of the following:

setting initial values of all SN-related variables of the RLC layer to 0, where the variable includes at least one of the following: RX_Next_Reassembly, RX_Timer_Trigger, or RX_Next_Highest; RX_Next_Reassembly is an SN corresponding to an earliest data packet that is still being reassembled, RX_Timer_Trigger is an SN corresponding to a data packet that triggers a reassembly timer, and RX_Next_Highest is one next to a highest SN delivered to the higher layer; because out-of-order reassembly is not required, all the foregoing three variables are not necessarily required, and the RX_Timer_Trigger variable is not required; RX_Next_Reassembly and RX_Next_Highest are equal in a case that disorder is not supported, and one of the two is selected for initialization and maintenance;

setting a length of a reordering timer of the RLC layer to 0; or setting a size of a reordering window of the RLC layer to 0.

In the process of receiving the MBS service at the RLC layer, it is specified that reordering is not performed.

(II) L2 Layer Status Update

The following describes a subsequent status update process after the terminal obtains the configuration information of the MBS service and performs initialization operations on the PDCP layer and the RLC layer.

(1) The PDCP Layer does not Support Out-of-Order Reception.

When the PDCP layer is configured not to support out-of-order reception, its SN and count value are both initialized to 0 (similar to an ordinary data radio bearer (DRB)), the reordering timer is 0, and there is no need to perform the reordering function.

Optionally, the receiving the MBS service based on the configuration information of the MBS service includes: if reordering is configured as disabled for the PDCP layer, considering each received data packet as a data packet that is outside the reordering window and that does not require any duplication detection and packet deletion processing, directly obtaining a service data unit (SDU) through parsing (depending on the configuration of the service, operations mainly include decompressing a header, deciphering and/or integrity verification, removing a PDCP header, and the like) and then delivering the SDU to the higher layer, and directly setting an SN part of a variable RX_NEXT or RX_DELIV (a count value is 32 bits, its low bit part is an SN, and a high bit part is an HFN; and if the SN is 18 bits, the HFN is 14 high bits; or if the SN is 12 bits, the HFN is 20 high bits) of the PDCP layer to an SN of the received data packet or SN+1, and setting an HFN part to 0 or any other arbitrary or prescribed value that ensures that the count value is positive, where the arbitrary value usually corresponds to an MBS service that does not require a security operation, and the prescribed value usually corresponds to an MBS service that requires unified security processing at a sender and a receiver.

(2) The PDCP Layer Supports Out-of-Order Reception.

When the PDCP layer is configured to support out-of-order reception, its SN and count value are both initialized and set based on the SN carried in the first received data packet (different from an ordinary DRB), the reordering timer length is a positive value, and the reordering function needs to be performed.

Optionally, the receiving the MBS service based on configuration information of the MBS service includes:

if reordering is configured as enabled for the PDCP layer, determining whether each received data packet is in the reordering window;

for a data packet that is outside the reordering window and that does not require any duplication detection and packet deletion processing, directly obtaining an SDU through parsing (depending on the configuration of the service, operations mainly include decompressing a header, deciphering and/or integrity verification, removing a PDCP header, and the like) and then delivering the SDU to the higher layer, and directly setting an SN part of a variable RX_DELIV (a count value is 32 bits, its low bit part is an SN, and a high bit part is an HFN; and if the SN is 18 bits, the HFN is 14 high bits; or if the SN is 12 bits, the HFN is 20 high bits) of the PDCP layer to an SN of the received data packet plus 1, and setting an HFN part to 0 or any other arbitrary or prescribed value that ensures that the count value is positive, where the arbitrary value usually corresponds to an MBS service that does not require a security operation, and the prescribed value usually corresponds to an MBS service that requires unified security processing at a sender and a receiver; and for a data packet in the reordering window, proving that the data packet is a data packet within a reordering range, and determining whether the data packet is duplicate; if the data packet is duplicate, deleting the data packet; or if the data packet is not duplicate, considering the data packet as a correctly received data packet, and considering updating an RX_NEXT variable based on a position of the data packet (for example, an SN part is exactly equal to an SN part of an existing RX_NEXT variable), where an update process is similar to that of RX_DELIV, and mainly an HFN part is special and different from that of an existing DRB; and directly setting the SN part of RX_NEXT to an SN of the received data packet plus 1, and setting the HFN part to 0 or any other arbitrary or prescribed value that ensures that a count value is positive, where the arbitrary value usually corresponds to an MBS service that does not require a security operation, and the prescribed value usually corresponds to an MBS service that requires unified security processing at a sender and a receiver.

(3) The RLC Layer does not Support Out-of-Order Reception.

When the RLC layer is configured not to support out-of-order reception, values of all its SN variables are initialized to 0 (similar to an ordinary DRB), the reordering timer is 0, and there is no need to perform the reordering function.

Optionally, the receiving the MBS service based on the configuration information of the MBS service includes:

if reordering is configured as disabled for the RLC layer, considering that segments of each received RLC protocol data unit (Protocol Data Unit, PDU) are in order, that is, for a data packet with RLC SN=x, first receiving a first segment, then receiving a second segment, then receiving a third segment, until a last segment is successfully received, and then receiving a data packet with RLC SN=x+1. No timer is started or restarted, and there is no need to perform the reordering function. This means that if the first segment is received and then the third segment is received, the UE considers the second segment is lost and will not be retransmitted. In this case, it may be directly determined that the data packet with RLC SN=x fails to be received, and it is unnecessary to wait any longer, and a data packet with RLC SN=x+1 is expected, that is, the RX_Next Reassembly and/or RX_Next_Highest variables are/is directly set to x+1.

(4) The RLC Layer Supports Out-of-Order Reception.

When the RLC layer is configured to support out-of-order reception, values of all its SN variables are initialized and set based on a first received SN (different from an ordinary DRB), the reordering timer is a positive value, and the reordering function needs to be performed.

In this embodiment of this application, optionally, the receiving the MBS service based on the configuration information of the MBS service includes: if reordering is configured as enabled for the RLC layer, directly delivering a completely received RLC SDU to the higher layer without ordering, and the PDCP performs reordering to reorder every RLC PDU segment.

For example, if a first segment is received and then a third segment is received, a second segment is considered as lost, the reordering timer is started, and the RX_Timer_Trigger variable records an SN number of a corresponding PDU that currently triggers the reordering timer; if the second segment is received before the reordering timer expires, the reordering timer is stopped, reordering is considered as successful, and segments constitute a complete SDU for delivery to the higher layer; if the second segment is still not received when the reordering timer expires, reordering is considered as failed, corresponding waiting for the data packet with this SN is stopped, and an incomplete segment is deleted or a received incomplete segment is delivered to the higher layer, and the higher layer finds a way to parse a part of the data packet.

In this embodiment of this application, optionally, both the PDCP layer and the RLC layer support reordering. This is applied to a case of out-of-order reception, and a correct data receiving process is performed. Alternatively, neither the PDCP layer nor the RLC layer supports reordering. This is applied to a case of in-order reception and a correct data receiving process is performed.

(III) Other Scenarios

In this embodiment of this application, optionally, an MRB or a DRB is used to carry the MBS service.

The foregoing embodiment mainly focuses on the configuration of the multicast radio bearer (MRB) and L2 layer processing. There are also some other scenarios. For example, the MBS service is carried by unicast or the DRB, or switching is performed between the DRB and the MRB that both carry the MBS service. Similar processing modes may also be considered, to ensure smooth reception of MBS data.

(1) The Following First Describes the DRB Carrying the MBS Service.

From a perspective of the DRB, initialization and update processing of its PDCP and RLC layer variables are all existing processes. For example, the variables are initialized to 0, and the reordering window size is half of the SN space. Generally, reordering needs to be performed (because the conventional unicast HARQ feedback and retransmission are supported by default), the reordering timer size is configured separately for each bearer, and unacknowledged (UM) and acknowledged (AM) modes may be optionally configured. For the DRB carrying the MBS service, the existing configuration can be directly reused.

Alternatively, the DRB carrying the MBS service is configured in a way different from existing unicast. For example, some new configuration parameters can be introduced, such as duration of the reordering timer, or a reordering function switch is introduced for the PDCP layer and RLC layer of the DRB (that is, the reordering function is not supported by default, and whether the reordering function is supported can be configured).

(2) Scenario of Switching from the MRB to the DRB Carrying the MBS Service (for the Same MBS Service)

Generally, a new DRB should be a newly established L2 entity (in a scenario of new establishment, a new configuration can be determined arbitrarily), and initialized. Alternatively, a related L2 entity of the MRB may be considered and directly used for continuity (generally, configuration parameters of PDCP and RLC should be consistent in the continuity scenario; otherwise, continuity is impossible).

To be specific, optionally, the method further includes:

if switching from an MRB to a DRB is required, receiving configuration information of the MBS service of the DRB, and establishing a new PDCP layer and/or RLC layer for the DRB based on the configuration information of the MBS service of the DRB;

or if switching from an MRB to a DRB is required, using a PDCP layer configuration and/or an RLC configuration of the MRB for the DRB.

Because the DRB carrying the MBS service is configured by using dedicated RRC signaling, switching is generally accompanied by dedicated signaling. The dedicated signaling may carry a configuration parameter of the new DRB or even values of some state variables. For example, an initial value of the DRB starts from SN=100, to continue from the MRB.

(3) Scenario of Switching from the DRB Carrying the MBS Service to the MRB (for the Same MBS Service)

Generally, a new MRB should be a newly established L2 entity (in a scenario of new establishment, a new configuration may not consider connection with the previous DRB), and initialized. Alternatively, a related state variable of the previous DRB may be considered for continuity (generally, configuration parameters of PDCP and RLC should be consistent in the continuity scenario; otherwise, continuity is impossible).

To be specific, optionally, the method further includes:

if switching from a DRB to an MRB is required, receiving configuration information of the MBS service of the MRB, and establishing a new PDCP layer and/or RLC layer for the MRB based on the configuration information of the MBS service of the MRB;

or if switching from a DRB to an MRB is required, using a PDCP layer configuration and/or an RLC configuration of the DRB for the MRB.

Because the MRB needs to take into account idle/inactive UEs, there is a high probability that a broadcast/SIB mode is used to send the configuration information of the MBS service. The network side may send a switching indication to the UE, so that the UE reads related configurations from the SIB. Alternatively, the network side may directly send the configuration information of the service carried by the MRB to the corresponding UE by using dedicated signaling, so that the UE receives the service carried by the MRB as soon as possible.

Figure 4:
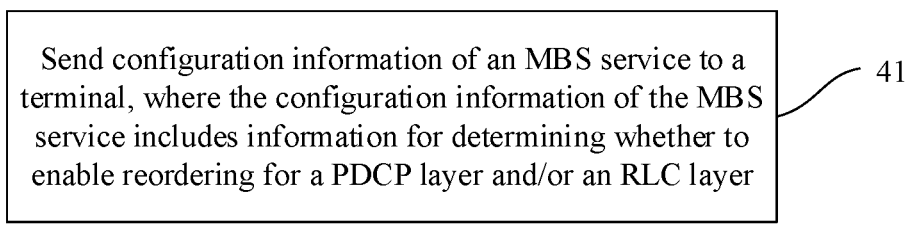
FIG. 4 is a schematic flowchart of a multicast service configuration method according to an embodiment of this application.

Referring to FIG. 4, an embodiment of this application further provides a multicast service configuration method. The method is applied to a network-side device and includes the following step.

Step 41: Send configuration information of an MBS service to a terminal, where the configuration information of the MBS service includes information for determining whether to enable reordering for a PDCP layer and/or an RLC layer.

In this embodiment of this application, the network side configures the configuration information of the MBS service for the terminal, so that the terminal can perform a protocol stack operation corresponding to the MBS service, thereby correctly receiving and processing the MBS service, and ensuring MBS service experience of the terminal and system efficiency.

Optionally, the configuration information of the MBS service is sent to the terminal in at least one of the following modes:
  i. a system information block (SIB), system information, or a broadcast mode;
  ii. dedicated signaling (Dedicated RRC signaling), sent to specific UE; or
  iii. preconfiguration information (Pre-configuration signaling), which may be obtained when the UE is connected to a network.

In this embodiment of this application, the information for determining whether to enable reordering for a PDCP layer and/or an RLC layer in the configuration information of the MBS service may be in various forms. The following uses examples for description.

In some embodiments of this application, optionally, the information for determining whether to enable reordering for the PDCP layer and/or the RLC layer includes at least one of the following:
  a configuration parameter of the PDCP layer, where the configuration parameter of the PDCP layer includes at least one of the following: whether the PDCP layer is required; whether to enable reordering for the PDCP layer; or a reordering parameter of the PDCP layer; or
  a configuration parameter of the RLC layer, where the configuration parameter of the RLC layer includes at least one of the following: whether to enable reordering for the RLC layer; or a reordering parameter of the RLC layer.

The reordering parameter of the PDCP layer may include at least one of the following: a reordering window or a reordering timer. The reordering parameter of the RLC layer may include at least one of the following: a reordering window or a reordering timer.

In some embodiments of this application, optionally, the information for determining whether to enable reordering for the PDCP layer and/or the RLC layer includes:
  indication information, used to indicate whether to enable reordering for the PDCP layer and/or the RLC layer.

In some embodiments of this application, optionally, the information for determining whether to enable reordering for the PDCP layer and/or the RLC layer includes:
  first configuration information, used to implicitly indicate determining whether to enable reordering for the PDCP layer and/or the RLC layer, where
  the first configuration information includes at least one of the following: a HARQ feedback configuration parameter, a QoS related parameter, a block error rate, or whether to enable an in-order delivery function for a service layer; and
  the HARQ feedback configuration parameter includes at least one of the following: whether the MBS service requires a HARQ feedback; or a parameter used for the HARQ feedback.

In this embodiment of this application, optionally, in addition to the foregoing content, the configuration information of the MBS service may further include:
  an MBS service identity, such as a temporary mobile group identity (TMGI);
  service information of the MBS service, such as a period, a period offset, a sending period (duration) in the period, or the like; and
  scheduling and transmission information of the MBS service, such as a g-RNTI (group RNTI), a parameter used for scheduling, a resource parameter, a transmission parameter such as a modulation and coding scheme (MCS) table, or the like.

It should be noted that the multicast service receiving method provided in this embodiment of this application may be performed by a multicast service receiving apparatus, or a control module configured to perform the multicast service receiving method in the multicast service receiving apparatus. In this embodiment of this application, the multicast service receiving apparatus provided in this embodiment of this application is described by using an example in which the multicast service receiving apparatus performs the multicast service receiving method.

Figure 5:
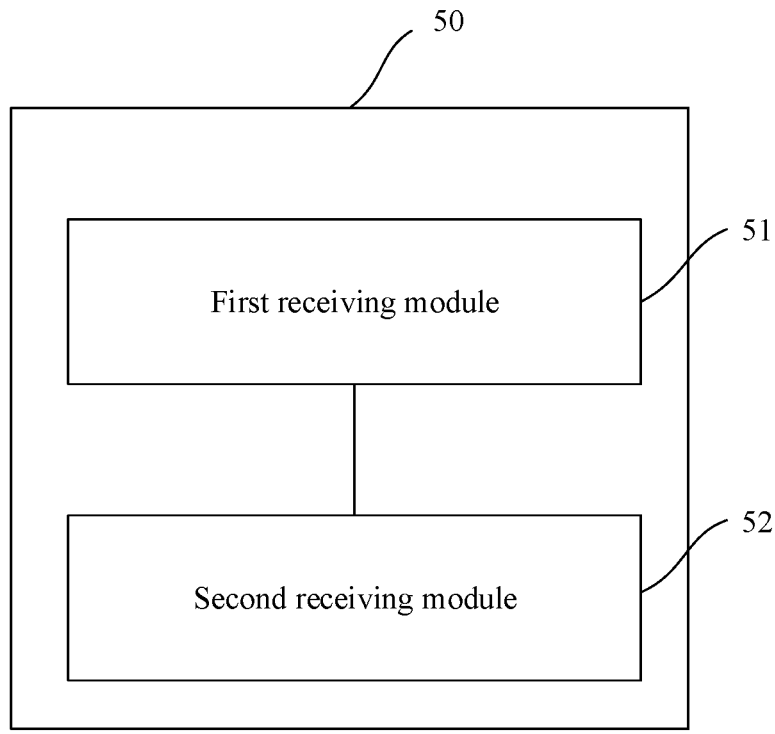
FIG. 5 is a schematic diagram of a structure of a multicast service receiving apparatus according to an embodiment of this application.

Referring to FIG. 5, an embodiment of this application further provides a multicast service receiving apparatus 50, including:
  a first receiving module 51, configured to receive configuration information of an MBS service sent by a network-side device, where the configuration information of the MBS service includes information for determining whether to enable reordering for a PDCP layer and/or an RLC layer; and
  a second receiving module 52, configured to receive the MBS service based on the configuration information of the MBS service.

In this embodiment of this application, the terminal can correctly receive and process the MBS service under control of the network side, thereby ensuring the MBS service experience of the terminal and system efficiency.

Optionally, the information for determining whether to enable reordering for the PDCP layer and/or the RLC layer includes at least one of the following:
  a configuration parameter of the PDCP layer, where the configuration parameter of the PDCP layer includes at least one of the following: whether the PDCP layer is required; whether to enable reordering for the PDCP layer; or a reordering parameter of the PDCP layer; or
  a configuration parameter of the RLC layer, where the configuration parameter of the RLC layer includes at least one of the following: whether to enable reordering for the RLC layer; or a reordering parameter of the RLC layer.

Optionally, the multicast service receiving apparatus 50 further includes:
  a first execution module, configured to: if the configuration parameter of the PDCP layer includes the reordering parameter of the PDCP layer, perform at least one of the following: determining to enable reordering for the PDCP layer; determining to enable reordering for the RLC layer; if the reordering parameter of the PDCP layer is configured, using the configured reordering parameter, or if the reordering parameter of the PDCP layer is not configured, using a default value; or using a default value for the reordering parameter of the RLC layer; or if the configuration parameter of the PDCP layer does not include the reordering parameter of the PDCP layer, perform at least one of the following: determining to disable reordering for the PDCP layer; or determining to disable reordering for the RLC layer. The configured reordering parameter of the PDCP layer includes at least one of the following: a reordering window, a reordering timer, or a sequence number SN space size.

Optionally, the multicast service receiving apparatus 50 further includes:
  a second execution module, configured to: if the configuration parameter of the RLC layer includes the reordering parameter of the RLC layer, perform at least one of the following: determining to enable reordering for the PDCP layer; determining to enable reordering for the RLC layer; if the reordering parameter of the RLC layer is configured, using the configured reordering parameter, or if the reordering parameter of the RLC layer is not configured, using a default value; or using a default value for the reordering parameter of the PDCP layer; or if the configuration parameter of the RLC layer does not include the reordering parameter of the RLC layer, determine to disable reordering for the RLC layer. The configured reordering parameter of the RLC layer includes at least one of the following: a reordering window, a reordering timer, or an SN space size.

Optionally, the multicast service receiving apparatus 50 further includes:
a third execution module, configured to perform one of the following:
if the configuration information of the MBS service includes a group of configuration parameters of the PDCP layer or a group of configuration parameters of the RLC layer, and the group of configuration parameters indicates that reordering is to be enabled, determining to enable reordering for both the PDCP layer and the RLC layer;
if the configuration information of the MBS service includes a group of configuration parameters of the PDCP layer or a group of configuration parameters of the RLC layer, and the group of configuration parameters indicates that reordering is to be disabled, determining to disable reordering for both the PDCP layer and the RLC layer; or
if the configuration information of the MBS service includes a group of configuration parameters of the PDCP layer or a group of configuration parameters of the RLC layer, determining to use the group of configuration parameters for one of the PDCP layer and the RLC layer and use default configuration parameters for the other.

Optionally, the information for determining whether to enable reordering for the PDCP layer and/or the RLC layer includes:
indication information, used to indicate whether to enable reordering for the PDCP layer and/or the RLC layer.

Optionally, the multicast service receiving apparatus 50 further includes:
a fourth execution module, configured to perform one of the following:
if the indication information indicates that reordering is to be disabled, using a first group of default configuration parameters for the PDCP layer and/or the RLC layer, where the first group of default configuration parameters includes at least one of the following: a reordering window size is 0 or a reordering timer length is 0;
if the indication information indicates that reordering is to be enabled, using a second group of default configuration parameters for the PDCP layer and/or the RLC layer, where the second group of default configuration parameters includes at least one of the following: a reordering window size is N1 or a reordering timer length is m1, where both N1 and m1 are non-zero positive values; or
if the indication information indicates that reordering is to be enabled, using a third group of default configuration parameters for the PDCP layer, and using a fourth group of default configuration parameters for the RLC layer, where the third group of default configuration parameters includes at least one of the following: a reordering window size is N2 or a reordering timer length is m2, and the fourth group of default configuration parameters includes at least one of the following: a reordering window size is N3 or a reordering timer length is m3, where N2, m2, N3, and m3 are all non-zero positive values.

Optionally, the information for determining whether to enable reordering for the PDCP layer and/or the RLC layer includes:
first configuration information, used to implicitly indicate whether to enable reordering for the PDCP layer and/or the RLC layer, where
the first configuration information includes at least one of the following: a HARQ feedback configuration parameter, a QoS related parameter, a block error rate, or whether to enable an in-order delivery function for a service layer; and
the HARQ feedback configuration parameter includes at least one of the following: whether the MBS service requires a HARQ feedback; or a parameter used for the HARQ feedback.

Optionally, the first configuration information includes the HARQ feedback configuration parameter; and
the multicast service receiving apparatus 50 further includes:
a fifth execution module, configured to perform one of the following:
if the MBS service does not require the HARQ feedback, determining at least one of the following: not requiring the PDCP layer; disabling reordering for the PDCP layer; disabling reordering for the RLC layer; or using a first group of default configuration parameters for the PDCP layer and/or the RLC layer, where the first group of default configuration parameters includes at least one of the following: a reordering window size is 0 or a reordering timer length is 0;
if the MBS service requires the HARQ feedback, determining at least one of the following: requiring the PDCP layer; enabling reordering for the PDCP layer; enabling reordering for the RLC layer; or using a second group of default configuration parameters for the PDCP layer and/or the RLC layer, where the second group of default configuration parameters includes at least one of the following: a reordering window size is N1 or a reordering timer length is m1, where both N1 and m1 are non-zero positive values;
if the MBS service requires the HARQ feedback, determining at least one of the following: requiring the PDCP layer; enabling reordering for the PDCP layer; enabling reordering for the RLC layer; or using a third group of default configuration parameters for the PDCP layer and using a fourth group of default configuration parameters for the RLC layer, where the third group of default configuration parameters includes at least one of the following: a reordering window size is N2 or a reordering timer length is m2, and the fourth group of default configuration parameters includes at least one of the following: a reordering window size is N3 or a reordering timer length is m3, where N2, m2, N3, and m3 are all non-zero positive values;
if the MBS service requires the HARQ feedback, and only one HARQ process is configured for the MBS service, or the network-side device explicitly or implicitly indicates that MBS data packets are not out of order, determining at least one of the following: not requiring the PDCP layer; disabling reordering for the PDCP layer; disabling reordering for the RLC layer; or using a first group of default configuration parameters for the PDCP layer and/or the RLC layer, where the first group of default configuration parameters includes at least one of the following: a reordering window size is 0 or a reordering timer length is 0;

if the MBS service requires the HARQ feedback, and a plurality of HARQ processes are configured for the MBS service, or the network-side device explicitly or implicitly indicates that MBS data packets are out of order, determining at least one of the following: requiring the PDCP layer; enabling reordering for the PDCP layer; enabling reordering for the RLC layer; or using a second group of default configuration parameters for the PDCP layer and/or the RLC layer, where the second group of default configuration parameters includes at least one of the following: a reordering window size is N1 or a reordering timer length is m1, where both N1 and m1 are non-zero positive values; or if the MBS service requires the HARQ feedback, and a plurality of HARQ processes are configured for the MBS service, or the network-side device explicitly or implicitly indicates that MBS data packets are out of order, determining at least one of the following: requiring the PDCP layer; enabling reordering for the PDCP layer; enabling reordering for the RLC layer; or using a third group of default configuration parameters for the PDCP layer and using a fourth group of default configuration parameters for the RLC layer, where the third group of default configuration parameters includes at least one of the following: a reordering window size is N2 or a reordering timer length is m2, and the fourth group of default configuration parameters includes at least one of the following: a reordering window size is N3 or a reordering timer length is m3, where N2, m2, N3, and m3 are all non-zero positive values.

Optionally, the multicast service receiving apparatus 50 further includes:

a sixth execution module, configured to perform one of the following:

not establishing the PDCP layer;

establishing the PDCP layer for which reordering is disabled; or establishing the PDCP layer for which reordering is enabled.

Optionally, the establishing the PDCP layer for which reordering is disabled includes at least one of the following:

setting initial values of all SN-related variables of the PDCP layer to 0, where the variable includes at least one of the following: RX_NEXT, RX_DELIV, or RX_REORD;

setting a length of a reordering timer of the PDCP layer to 0; or setting a size of a reordering window of the PDCP layer to 0.

In the process of receiving the MBS service at the PDCP layer, it is specified that reordering is not performed.

Optionally, the establishing the PDCP layer for which reordering is enabled includes at least one of the following:

initializing an SN-related variable of the PDCP layer, where an initial value of the SN-related variable of the PDCP layer is calculated based on an SN of a first received data packet, and the variable includes at least one of the following: RX_NEXT, RX_DELIV, or RX_REORD;

setting a length of a reordering timer of the PDCP layer to a non-zero positive value, where the non-zero positive value is configured by the configuration information of the MBS service or prescribed in a protocol; or setting a size of a reordering window of the PDCP layer to a non-zero positive value, where the non-zero positive value is configured by the configuration information of the MBS service or prescribed in a protocol.

In the process of receiving the MBS service at the PDCP layer, it is specified that reordering is performed.

Optionally, an SN part of an initial value of RX_NEXT is equal to the SN of the first received data packet or SN+1 modulo SN space size, and an HFN part needs to ensure RX_NEXT; for example, the HFN part is 0 or 1;

an SN part of an initial value of RX_DELIV is equal to (SN of the first received data packet−0.5*reordering window size) modulo SN space size, and an HFN part needs to ensure that a count value is positive; and an initial value of RX_REORD is 0.

Optionally, the multicast service receiving apparatus 50 further includes:

a seventh execution module, configured to perform one of the following:

establishing the RLC layer for which reordering is enabled; or establishing the RLC layer for which reordering is disabled.

Optionally, the establishing the RLC layer for which reordering is enabled includes at least one of the following:

initializing an SN-related variable of the RLC layer, where an initial value of the SN-related variable of the RLC layer is calculated based on an RLC SN of a first received data packet, and the variable includes at least one of the following: RX_Next_Reassembly, RX_Timer_Trigger, or RX_Next_Highest;

setting a length of a reordering timer of the RLC layer to a non-zero positive value, where the non-zero positive value is configured by the configuration information of the MBS service or prescribed in a protocol; or setting a size of a reordering window of the RLC layer to a non-zero positive value, where the non-zero positive value is configured by the configuration information of the MBS service or prescribed in a protocol.

In the process of receiving the MBS service at the RLC layer, it is specified that reordering is performed.

Optionally, an initial value of RX_Next_Reassembly is set to the SN of the first received RLC PDU or SN+1 modulo SN space size;

an initial value of RX_Timer_Trigger is set to 0; or an initial value of RX_Next_Highest is set to the SN of the first received RLC PDU or SN+1 modulo SN space size.

Optionally, the establishing the RLC layer for which reordering is disabled includes at least one of the following:

setting initial values of all SN-related variables of the RLC layer to 0, where the variable includes at least one of the following: RX_Next_Reassembly, RX_Timer_Trigger, or RX_Next_Highest;

setting a length of a reordering timer of the RLC layer to 0; or setting a size of a reordering window of the RLC layer to 0.

In the process of receiving the MBS service at the RLC layer, it is specified that reordering is not performed.

Optionally, the second receiving module is configured to: if reordering is configured as disabled for the PDCP layer, for each received data packet, directly obtain an SDU through parsing and then deliver the SDU to a higher layer, and directly set an SN part of a variable RX_NEXT or RX_DELIV of the PDCP layer to an SN of the received data packet or SN+1, and set an HFN part to 0 or any other arbitrary or prescribed value that ensures that a count value is positive.

Optionally, an MRB or a DRB is used to carry the MBS service.

Optionally, the multicast service receiving apparatus 50 further includes:

an eighth execution module, configured to: if switching from an MRB to a DRB is required, receive configuration information of the MBS service of the DRB, and establish a new PDCP layer and/or RLC layer for the DRB based on the configuration information of the MBS service of the DRB; or if switching from an MRB to a DRB is required, use a PDCP layer configuration and/or an RLC configuration of the MRB for the DRB.

Optionally, the multicast service receiving apparatus 50 further includes:

a ninth execution module, configured to: if switching from a DRB to an MRB is required, receive configuration information of the MBS service of the MRB, and establish a new PDCP layer and/or RLC layer for the MRB based on the configuration information of the MBS service of the MRB; or if switching from a DRB to an MRB is required, use a PDCP layer configuration and/or an RLC configuration of the DRB for the MRB.

Optionally, the configuration information of the MBS service of the MRB is configured in at least one of the following modes:

a system information block, system information, or a broadcast mode; or dedicated signaling.

The multicast service receiving apparatus in this embodiment of this application may be a terminal, or may be a component, an integrated circuit, or a chip in a terminal. The apparatus may be a mobile terminal, or may be a nonmobile terminal. For example, the mobile terminal may include but is not limited to the foregoing illustrated type of the terminal 11. The nonmobile terminal may be a server, a network attached storage (NAS), a personal computer (PC), a television (TV), a teller machine, a self-service machine, or the like. This is not specifically limited in this embodiment of this application.

The multicast service receiving apparatus in this embodiment of this application may be an apparatus having an operating system. The operating system may be an Android operating system, an iOS operating system, or other possible operating systems, and is not specifically limited in this embodiment of this application.

The multicast service receiving apparatus provided in this embodiment of this application can implement each process implemented by the method embodiment in FIG. 3, with the same technical effect achieved. To avoid repetition, details are not described herein again.

It should be noted that the multicast service configuration method provided in this embodiment of this application may be performed by a multicast service configuration apparatus, or a control module configured to perform the multicast service configuration method in the multicast service configuration apparatus. In this embodiment of this application, the multicast service configuration apparatus provided in this embodiment of this application is described by using an example in which the multicast service configuration apparatus performs the multicast service configuration method.

Figure 6:
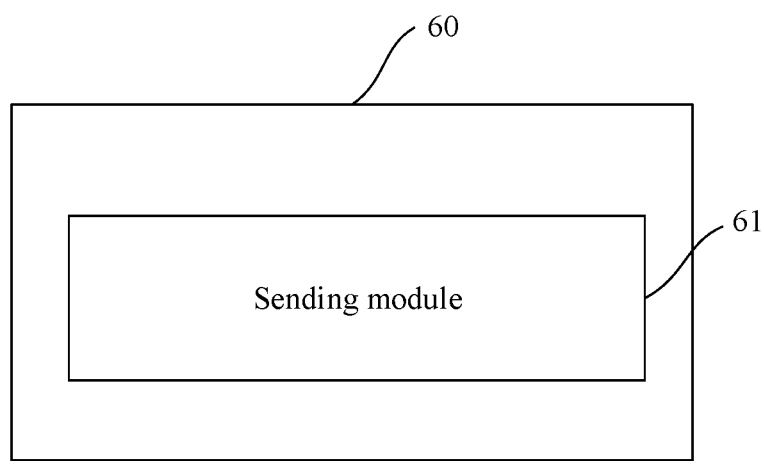
FIG. 6 is a schematic diagram of a structure of a multicast service configuration apparatus according to an embodiment of this application.

Referring to FIG. 6, an embodiment of this application further provides a multicast service configuration apparatus 60, including:

a sending module 61, configured to send configuration information of an MBS service to a terminal, where the configuration information of the MBS service includes information for determining whether to enable reordering for a PDCP layer and/or an RLC layer.

In this application, the network side configures the configuration information of the MBS service for the terminal, so that the terminal can correctly receive and process the MBS service, thereby ensuring the MBS service experience of the terminal and system efficiency.

Optionally, the sending module is configured to send the configuration information of the MBS service to the terminal in at least one of the following modes:

a system information block, system information, or a broadcast mode;

dedicated signaling; or preconfiguration information.

Optionally, the information for determining whether to enable reordering for the PDCP layer and/or the RLC layer includes at least one of the following:

a configuration parameter of the PDCP layer, where the configuration parameter of the PDCP layer includes at least one of the following: whether the PDCP layer is required; whether to enable reordering for the PDCP layer; or a reordering parameter of the PDCP layer; or a configuration parameter of the RLC layer, where the configuration parameter of the RLC layer includes at least one of the following: whether to enable reordering for the RLC layer; or a reordering parameter of the RLC layer.

Optionally, the information for determining whether to enable reordering for the PDCP layer and/or the RLC layer includes:

indication information, used to indicate whether to enable reordering for the PDCP layer and/or the RLC layer.

Optionally, the information for determining whether to enable reordering for the PDCP layer and/or the RLC layer includes:

first configuration information, used to implicitly indicate determining whether to enable reordering for the PDCP layer and/or the RLC layer, where the first configuration information includes at least one of the following: a HARQ feedback configuration parameter, a QoS related parameter, a block error rate, or whether to enable an in-order delivery function for a service layer; and the HARQ feedback configuration parameter includes at least one of the following: whether the MBS service requires a HARQ feedback; or a parameter used for the HARQ feedback.

The multicast service configuration apparatus provided in this embodiment of this application can implement each process implemented by the method embodiment in FIG. 4, with the same technical effect achieved. To avoid repetition, details are not described herein again.

This application provides a multicast broadcast service receiving method to resolve a problem of correct assignment of an SN (sequence number) when the multicast broadcast service is sent based on service features and received by UE and better support transmission of the multicast broadcast service. The UE can efficiently receive and process the multicast broadcast service correctly based on a transmission parameter of the multicast broadcast service configured by the network. This further improves service QoS (Quality of Service) guarantee, that is, user experience and system efficiency.

Figure 7:
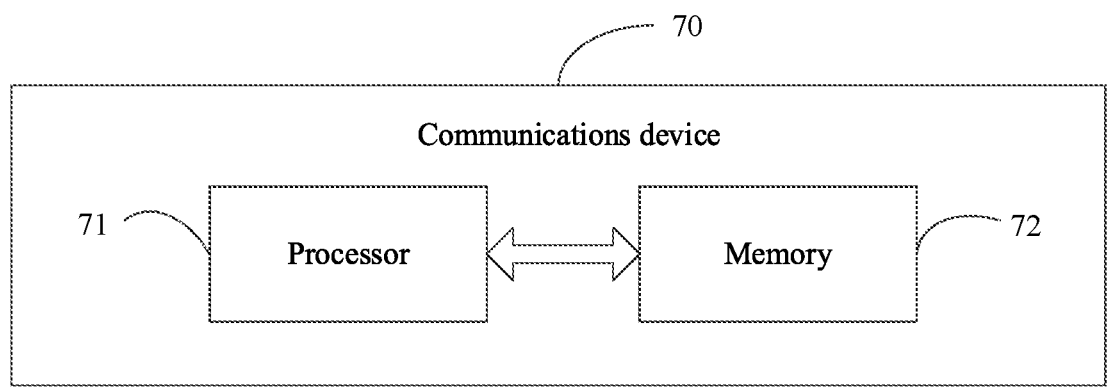
FIG. 7 is a schematic diagram of a structure of a communications device according to an embodiment of this application.

As shown in FIG. 7, an embodiment of this application further provides a communications device 70, including a processor 71, a memory 72, and a program or instructions stored in the memory 72 and capable of running on the processor 71. For example, when the communications device 70 is a terminal, and the program or instructions are executed by the processor 71, each process of the foregoing multicast service receiving method embodiment is implemented, with the same technical effect achieved. When the communications device 70 is a network-side device, and the program or instructions are executed by the processor 71, each process of the foregoing multicast service configuration method embodiment is implemented, with the same technical effect achieved. To avoid repetition, details are not described herein again.

Figure 8:
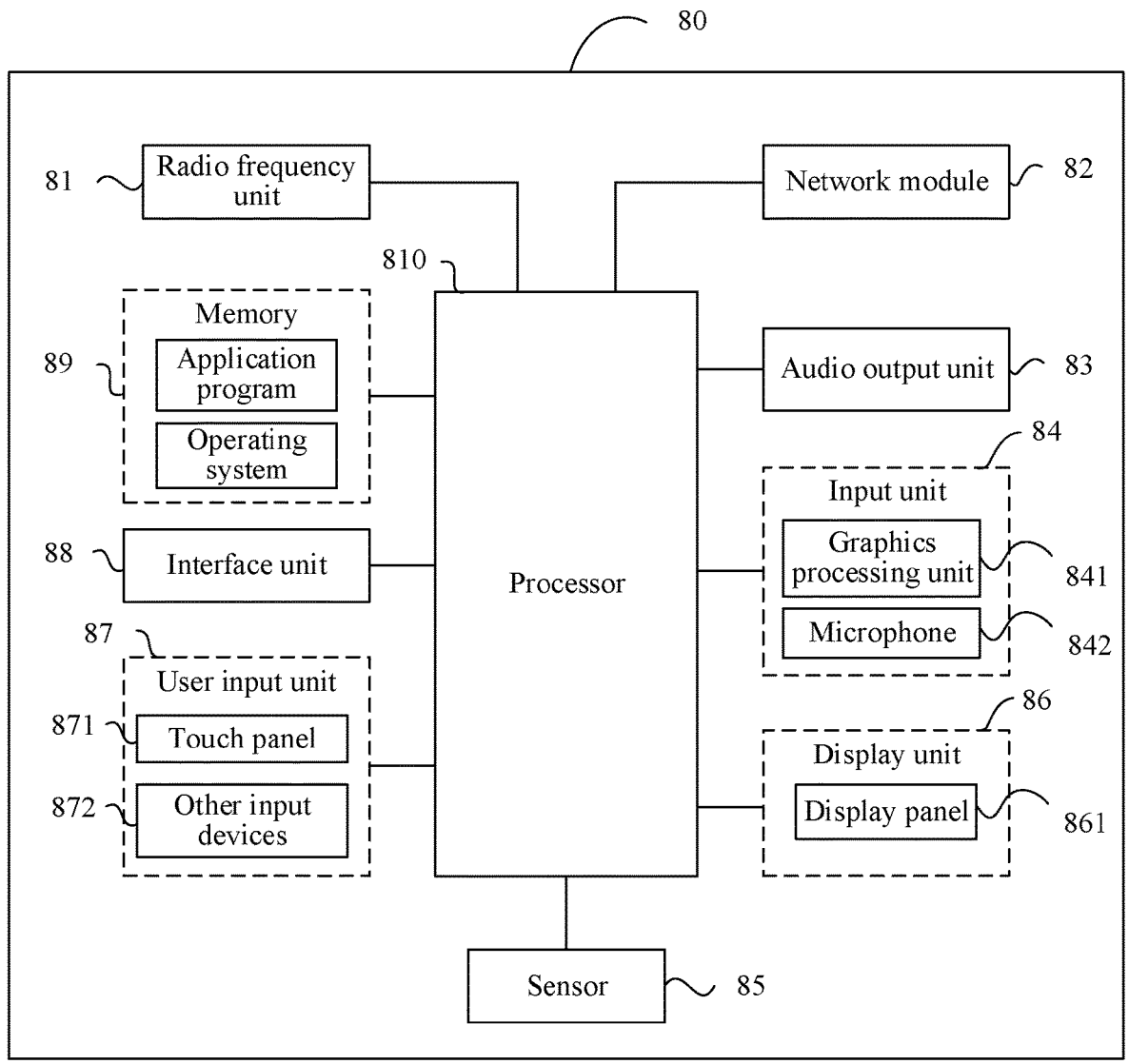
FIG. 8 is a schematic diagram of a hardware structure of a terminal according to an embodiment of this application.

FIG. 8 is a schematic diagram of a hardware structure of a terminal for implementing an embodiment of this application. The terminal 80 includes but is not limited to components such as a radio frequency unit 81, a network module 82, an audio output unit 83, an input unit 84, a sensor 85, a display unit 86, a user input unit 87, an interface unit 88, a memory 89, and a processor 810.

A person skilled in the art may understand that the terminal 80 may further include a power supply (for example, a battery) supplying power to all components. The power supply may be logically connected to the processor 810 through a power management system. In this way, functions such as charge management, discharge management, and power consumption management are implemented by using the power management system. The terminal structure shown in FIG. 8 does not constitute a limitation on the terminal. The terminal may include more or fewer components than those shown in the figure, or some components are combined, or component arrangements are different. Details are not described herein again.

It should be understood that, in this embodiment of this application, the input unit 84 may include a graphics processing unit (GPU) 841 and a microphone 842. The graphics processing unit 841 processes image data of a still picture or video obtained by an image capture apparatus (such as a camera) in a video capture mode or an image capture mode. The display unit 86 may include a display panel 861, and the display panel 861 may be configured in a form of a liquid crystal display, an organic light-emitting diode, or the like. The user input unit 87 includes a touch panel 871 and other input devices 872. The touch panel 871 is also referred to as a touchscreen. The touch panel 871 may include two parts: a touch detection apparatus and a touch controller. The other input devices 872 may include but are not limited to a physical keyboard, a function key (such as a volume control key or a switch key), a trackball, a mouse, and a joystick. Details are not described herein again.

In this embodiment of this application, after receiving downlink data from a network-side device, the radio frequency unit 81 sends the downlink data to the processor 810 for processing, and in addition, sends uplink data to the network-side device. Generally, the radio frequency unit 81 includes but is not limited to an antenna, at least one amplifier, a transceiver, a coupler, a low noise amplifier, a duplexer, and the like.

The memory 89 may be configured to store software programs or instructions and various data. The memory 89 may primarily include a program or instruction storage area and a data storage area. The program or instruction storage area may store an operating system, an application program or instructions (such as an audio play function and an image play function) required by at least one function, and the like. In addition, the memory 89 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or another non-volatile solid-state storage device.

The processor 810 may include one or more processing units. Optionally, the processor 810 may integrate an application processor and a modem processor. The application processor mainly processes the operating system, a user interface, an application program, or an instruction. The modem processor mainly processes wireless communication. For example, the modem processor is a baseband processor. It may be understood that the modem processor may alternatively not be integrated in the processor 810.

The radio frequency unit 81 is configured to receive configuration information of a multicast broadcast service MBS service sent by a network-side device, where the configuration information of the MBS service includes information for determining whether to enable reordering for a packet data convergence protocol PDCP layer and/or a radio link control RLC layer.

The processor 810 is configured to receive the MBS service based on the configuration information of the MBS service.

In this embodiment of this application, the terminal can correctly receive and process the MBS service under control of the network side, thereby ensuring the MBS service experience of the terminal and system efficiency.

Optionally, the information for determining whether to enable reordering for the PDCP layer and/or the RLC layer includes at least one of the following:

a configuration parameter of the PDCP layer, where the configuration parameter of the PDCP layer includes at least one of the following: whether the PDCP layer is required; whether to enable reordering for the PDCP layer; or a reordering parameter of the PDCP layer; or a configuration parameter of the RLC layer, where the configuration parameter of the RLC layer includes at least one of the following: whether to enable reordering for the RLC layer; or a reordering parameter of the RLC layer.

Optionally, the processor 810 is further configured to: if the configuration parameter of the PDCP layer includes the reordering parameter of the PDCP layer, perform at least one of the following: determining to enable reordering for the PDCP layer; determining to enable reordering for the RLC layer; if the reordering parameter of the PDCP layer is configured, using the configured reordering parameter, or if the reordering parameter of the PDCP layer is not configured, using a default value; or using a default value for the reordering parameter of the RLC layer; or if the configuration parameter of the PDCP layer does not include the reordering parameter of the PDCP layer, perform at least one of the following: determining to disable reordering for the PDCP layer; or determining to disable reordering for the RLC layer. The configured reordering parameter of the PDCP layer includes at least one of the following: a reordering window, a reordering timer, or a sequence number SN space size.

Optionally, the processor 810 is further configured to: if the configuration parameter of the RLC layer includes the reordering parameter of the RLC layer, perform at least one of the following: determining to enable reordering for the PDCP layer; determining to enable reordering for the RLC layer; if the reordering parameter of the RLC layer is configured, using the configured reordering parameter, or if the reordering parameter of the RLC layer is not configured, using a default value; and using a default value for the reordering parameter of the PDCP layer; or if the configuration parameter of the RLC layer does not include the reordering parameter of the RLC layer, perform at least one of the following: determining to disable reordering for the PDCP layer; or determining to disable reordering for the RLC layer. The configured reordering parameter of the RLC layer includes at least one of the following: a reordering window, a reordering timer, or an SN space size.

Optionally, the processor 810 is further configured to perform one of the following:
- if the configuration information of the MBS service includes a group of configuration parameters of the PDCP layer or a group of configuration parameters of the RLC layer, and the group of configuration parameters indicates that reordering is to be enabled, determining to enable reordering for both the PDCP layer and the RLC layer;
- if the configuration information of the MBS service includes a group of configuration parameters of the PDCP layer or a group of configuration parameters of the RLC layer, and the group of configuration parameters indicates that reordering is to be disabled, determining to disable reordering for both the PDCP layer and the RLC layer; or
- if the configuration information of the MBS service includes a group of configuration parameters of the PDCP layer or a group of configuration parameters of the RLC layer, determining to use the group of configuration parameters for one of the PDCP layer and the RLC layer and use default configuration parameters for the other.

Optionally, the information for determining whether to enable reordering for the PDCP layer and/or the RLC layer includes:
indication information, used to indicate whether to enable reordering for the PDCP layer and/or the RLC layer.

Optionally, the processor 810 is further configured to perform one of the following:
- if the indication information indicates that reordering is to be disabled, using a first group of default configuration parameters for the PDCP layer and/or the RLC layer, where the first group of default configuration parameters includes at least one of the following: a reordering window size is 0 or a reordering timer length is 0;
- if the indication information indicates that reordering is to be enabled, using a second group of default configuration parameters for the PDCP layer and/or the RLC layer, where the second group of default configuration parameters includes at least one of the following: a reordering window size is N1 or a reordering timer length is m1, where both N1 and m1 are non-zero positive values; or
- if the indication information indicates that reordering is to be enabled, using a third group of default configuration parameters for the PDCP layer, and using a fourth group of default configuration parameters for the RLC layer, where the third group of default configuration parameters includes at least one of the following: a reordering window size is N2 or a reordering timer length is m2, and the fourth group of default configuration parameters includes at least one of the following: a reordering window size is N3 or a reordering timer length is m3, where N2, m2, N3, and m3 are all non-zero positive values.

Optionally, the information for determining whether to enable reordering for the PDCP layer and/or the RLC layer includes:
first configuration information, used to implicitly indicate whether to enable reordering for the PDCP layer and/or the RLC layer, where
the first configuration information includes at least one of the following: a hybrid automatic repeat request HARQ feedback configuration parameter, a quality of service QOS related parameter, a block error rate, or whether to enable an in-order delivery function for a service layer; and
the HARQ feedback configuration parameter includes at least one of the following: whether the MBS service requires a HARQ feedback; or a parameter used for the HARQ feedback.

Optionally, the first configuration information includes the HARQ feedback configuration parameter, and the processor 810 is further configured to perform one of the following:
- if the MBS service does not require the HARQ feedback, determining at least one of the following: not requiring the PDCP layer; disabling reordering for the PDCP layer; disabling reordering for the RLC layer; or using a first group of default configuration parameters for the PDCP layer and/or the RLC layer, where the first group of default configuration parameters includes at least one of the following: a reordering window size is 0 or a reordering timer length is 0;
- if the MBS service requires the HARQ feedback, determining at least one of the following: requiring the PDCP layer; enabling reordering for the PDCP layer; enabling reordering for the RLC layer; or using a second group of default configuration parameters for the PDCP layer and/or the RLC layer, where the second group of default configuration parameters includes at least one of the following: a reordering window size is N1 or a reordering timer length is m1, where both N1 and m1 are non-zero positive values;
- if the MBS service requires the HARQ feedback, determining at least one of the following: requiring the PDCP layer; enabling reordering for the PDCP layer; enabling reordering for the RLC layer; or using a third group of default configuration parameters for the PDCP layer and using a fourth group of default configuration parameters for the RLC layer, where the third group of default configuration parameters includes at least one of the following: a reordering window size is N2 or a reordering timer length is m2, and the fourth group of default configuration parameters includes at least one of the following: a reordering window size is N3 or a reordering timer length is m3, where N2, m2, N3, and m3 are all non-zero positive values;
- if the MBS service requires the HARQ feedback, and only one HARQ process is configured for the MBS service, or the network-side device explicitly or implicitly indicates that MBS data packets are not out of order, determining at least one of the following: not requiring the PDCP layer; disabling reordering for the PDCP layer; disabling reordering for the RLC layer; or using a first group of default configuration parameters for the PDCP layer and/or the RLC layer, where the first group of default configuration parameters includes at least one of the following: a reordering window size is 0 or a reordering timer length is 0;

if the MBS service requires the HARQ feedback, and a plurality of HARQ processes are configured for the MBS service, or the network-side device explicitly or implicitly indicates that MBS data packets are out of order, determining at least one of the following: requiring the PDCP layer; enabling reordering for the PDCP layer; enabling reordering for the RLC layer; or using a second group of default configuration parameters for the PDCP layer and/or the RLC layer, where the second group of default configuration parameters includes at least one of the following: a reordering window size is N1 or a reordering timer length is m1, where both N1 and m1 are non-zero positive values; or if the MBS service requires the HARQ feedback, and a plurality of HARQ processes are configured for the MBS service, or the network-side device explicitly or implicitly indicates that MBS data packets are out of order, determining at least one of the following: requiring the PDCP layer; enabling reordering for the PDCP layer; enabling reordering for the RLC layer; or using a third group of default configuration parameters for the PDCP layer and using a fourth group of default configuration parameters for the RLC layer, where the third group of default configuration parameters includes at least one of the following: a reordering window size is N2 or a reordering timer length is m2, and the fourth group of default configuration parameters includes at least one of the following: a reordering window size is N3 or a reordering timer length is m3, where N2, m2, N3, and m3 are all non-zero positive values.

Optionally, the processor 810 is further configured to perform one of the following:
not establishing the PDCP layer;
establishing the PDCP layer for which reordering is disabled; or
establishing the PDCP layer for which reordering is enabled.

Optionally, the establishing the PDCP layer for which reordering is disabled includes at least one of the following:
setting initial values of all sequence number SN-related variables of the PDCP layer to 0, where the variable includes at least one of the following: RX_NEXT, RX_DELIV, or RX_REORD;
setting a length of a reordering timer of the PDCP layer to 0; or
setting a size of a reordering window of the PDCP layer to 0.

In the process of receiving the MBS service at the PDCP layer, it is specified that reordering is not performed.

Optionally, the establishing the PDCP layer for which reordering is enabled includes at least one of the following:
initializing an SN-related variable of the PDCP layer, where an initial value of the SN-related variable of the PDCP layer is calculated based on an SN of a first received data packet, and the variable includes at least one of the following: RX_NEXT, RX_DELIV, or RX_REORD;
setting a length of a reordering timer of the PDCP layer to a non-zero positive value, where the non-zero positive value is configured by the configuration information of the MBS service or prescribed in a protocol; or
setting a size of a reordering window of the PDCP layer to a non-zero positive value, where the non-zero positive value is configured by the configuration information of the MBS service or prescribed in a protocol.

In the process of receiving the MBS service at the PDCP layer, it is specified that reordering is performed.

Optionally, an SN part of an initial value of RX_NEXT is equal to the SN of the first received data packet or SN+1 modulo SN space size, and a hyperframe number HFN part needs to ensure that RX_NEXT is positive;
an SN part of an initial value of RX_DELIV is equal to (SN of the first received data packet−0.5*reordering window size) modulo SN space size, and an HFN part needs to ensure that a count value is positive; and
an initial value of RX_REORD is 0.

Optionally, the processor 810 is further configured to perform one of the following:
establishing the RLC layer for which reordering is enabled; or
establishing the RLC layer for which reordering is disabled.

Optionally, the establishing the RLC layer for which reordering is enabled includes at least one of the following:
initializing an SN-related variable of the RLC layer, where an initial value of the SN-related variable of the RLC layer is calculated based on an RLC SN of a first received data packet, and the variable includes at least one of the following: RX_Next_Reassembly, RX_Timer_Trigger, or RX_Next_Highest;
setting a length of a reordering timer of the RLC layer to a non-zero positive value, where the non-zero positive value is configured by the configuration information of the MBS service or prescribed in a protocol; or
setting a size of a reordering window of the RLC layer to a non-zero positive value, where the non-zero positive value is configured by the configuration information of the MBS service or prescribed in a protocol.

In the process of receiving the MBS service at the RLC layer, it is specified that reordering is performed.

Optionally, an initial value of RX_Next_Reassembly is set to the SN of the first received RLC PDU or SN+1 modulo SN space size;
an initial value of RX Timer_Trigger is set to 0; or
an initial value of RX_Next_Highest is set to the SN of the first received RLC PDU or SN+1 modulo SN space size.

Optionally, the establishing the RLC layer for which reordering is disabled includes at least one of the following:
setting initial values of all SN-related variables of the RLC layer to 0, where the variable includes at least one of the following: RX_Next_Reassembly, RX_Timer_Trigger, or RX_Next_Highest;
setting a length of a reordering timer of the RLC layer to 0; or
setting a size of a reordering window of the RLC layer to 0.

In the process of receiving the MBS service at the RLC layer, it is specified that reordering is not performed.

Optionally, the processor 810 is further configured to: if reordering is configured as disabled for the PDCP layer, for each received data packet, directly obtain an SDU through parsing and then deliver the SDU to a higher layer, and directly set an SN part of a variable RX_NEXT or RX_DELIV of the PDCP layer to an SN of the received data packet or SN+1, and set an HFN part to 0 or any other arbitrary or prescribed value that ensures that a count value is positive.

Optionally, an MRB or a DRB is used to carry the MBS service.

Optionally, the processor 810 is further configured to: if switching from an MRB to a DRB is required, receive configuration information of the MBS service of the DRB, and establish a new PDCP layer and/or RLC layer for the DRB based on the configuration information of the MBS service of the DRB; or if switching from an MRB to a DRB is required, use a PDCP layer configuration and/or an RLC configuration of the MRB for the DRB.

Optionally, the processor 810 is further configured to: if switching from a DRB to an MRB is required, receive configuration information of the MBS service of the MRB, and establish a new PDCP layer and/or RLC layer for the MRB based on the configuration information of the MBS service of the MRB; or if switching from a DRB to an MRB is required, use a PDCP layer configuration and/or an RLC configuration of the DRB for the MRB.

Optionally, the configuration information of the MBS service of the MRB is configured in at least one of the following modes:

a system information block, system information, or a broadcast mode; or dedicated signaling.

Figure 9:
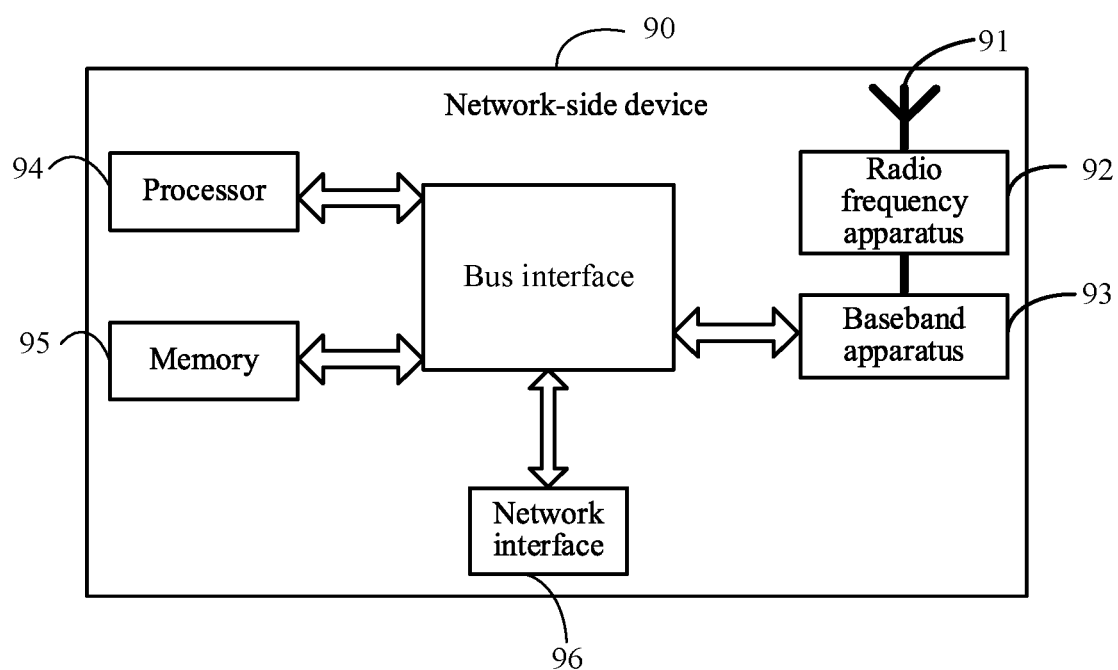
FIG. 9 is a schematic diagram of a structure of a network-side device according to an embodiment of this application.

An embodiment of this application further provides a network-side device. As shown in FIG. 9, the network device 90 includes an antenna 91, a radio frequency apparatus 92, and a baseband apparatus 93. The antenna 91 is connected to the radio frequency apparatus 92. In an uplink direction, the radio frequency apparatus 92 receives information by using the antenna 91, and sends the received information to the baseband apparatus 93 for processing. In a downlink direction, the baseband apparatus 93 processes to-be-sent information, and sends the information to the radio frequency apparatus 92; and the radio frequency apparatus 92 processes the received information and then sends the information out by using the antenna 91.

The method performed by the network-side device in the foregoing embodiment may be implemented in the baseband apparatus 93, and the baseband apparatus 93 includes a processor 94 and a memory 95.

The baseband apparatus 93 may include, for example, at least one baseband processing unit, where a plurality of chips are disposed on the baseband processing unit. As shown in FIG. 9, one of the chips is, for example, the processor 94, connected to the memory 95, to invoke a program in the memory 95 to perform the operation of the network device shown in the foregoing method embodiment.

The baseband apparatus 93 may further include a network interface 96, configured to exchange information with the radio frequency apparatus 92, where the interface is, for example, a common public radio interface (CPRI).

Specifically, the network-side device in this embodiment of this application further includes a program or instructions stored in the memory 95 and capable of running on the processor 94. When the processor 94 invokes the program or instructions in the memory 95, the method performed by each module shown in FIG. 6 is performed, with the same technical effect achieved. To avoid repetition, details are not described herein again.

An embodiment of this application further provides a readable storage medium. The readable storage medium stores a program or instructions. When the program or instructions are executed by a processor, each process of the foregoing multicast service receiving method embodiment is implemented, with the same technical effect achieved. To avoid repetition, details are not described herein again.

An embodiment of this application further provides a readable storage medium. The readable storage medium stores a program or instructions. When the program or instructions are executed by a processor, each process of the foregoing multicast service configuration method embodiment is implemented, with the same technical effect achieved. To avoid repetition, details are not described herein again.

The processor is a processor in the terminal in the foregoing embodiment. The readable storage medium includes a computer-readable storage medium, for example, a computer read-only memory (ROM), a random access memory (RAM), a magnetic disk, or an optical disc.

In addition, an embodiment of this application provides a chip. The chip includes a processor and a communications interface. The communications interface is coupled to the processor. The processor is configured to run a program or instructions on a network-side device to implement each process of the foregoing multicast service receiving method embodiment, with the same technical effect achieved. To avoid repetition, details are not described herein again.

In addition, an embodiment of this application provides a chip. The chip includes a processor and a communications interface. The communications interface is coupled to the processor. The processor is configured to run a program or instructions on a network-side device to implement each process of the foregoing multicast service configuration method embodiment, with the same technical effect achieved. To avoid repetition, details are not described herein again.

It should be understood that the chip provided in this embodiment of this application may also be referred to as a system-level chip, a system chip, a chip system, a system-on-chip, or the like.

In addition, an embodiment of this application provides a program product. The program product is stored in a non-volatile storage medium, and the program product is executed by at least one processor to implement each process of the foregoing multicast service receiving method embodiment, with the same technical effect achieved. To avoid repetition, details are not described herein again.

In addition, an embodiment of this application provides a program product. The program product is stored in a non-volatile storage medium, and the program product is executed by at least one processor to implement each process of the foregoing multicast service configuration method embodiment, with the same technical effect achieved. To avoid repetition, details are not described herein again.

It may be understood that the embodiments described in the present disclosure may be implemented by hardware, software, firmware, middleware, microcode, or a combination thereof. For hardware implementation, a module, unit, subunit, submodule, subunit, or the like may be implemented in one or more application specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this application, or a combination thereof.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary general hardware platform, and certainly may alternatively be implemented by using hardware. However, in most cases, the former is a preferred implementation. Based on such an understanding, the technical solutions of this application essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The embodiments of this application are described above with reference to the accompanying drawings. However, this application is not limited to the foregoing specific embodiments. The foregoing specific embodiments are merely illustrative rather than restrictive. Inspired by this application, a person of ordinary skill in the art can still derive a plurality of variations without departing from the essence of this application and the protection scope of the claims. All these variations shall fall within the protection scope of this application.

What is claimed is:

1. A multicast service receiving method, performed by a terminal and comprising:
   receiving configuration information of a multicast broadcast service (MBS) service sent by a network-side device, wherein the configuration information of the MBS service comprises information for determining whether to enable reordering for a packet data convergence protocol (PDCP) layer and/or a radio link control (RLC) layer; and
   receiving the MBS service based on the configuration information of the MBS service.

2. The method according to claim 1, wherein the information for determining whether to enable reordering for the PDCP layer and/or the RLC layer comprises at least one of the following:
   a configuration parameter of the PDCP layer, wherein the configuration parameter of the PDCP layer comprises at least one of the following: whether the PDCP layer is required; whether to enable reordering for the PDCP layer; or a reordering parameter of the PDCP layer; or
   a configuration parameter of the RLC layer, wherein the configuration parameter of the RLC layer comprises at least one of the following: whether to enable reordering for the RLC layer; or a reordering parameter of the RLC layer.

3. The method according to claim 2, further comprising:
   if the configuration parameter of the PDCP layer comprises the reordering parameter of the PDCP layer, performing at least one of the following: determining to enable reordering for the PDCP layer; determining to enable reordering for the RLC layer; if the reordering parameter of the PDCP layer is configured, using the configured reordering parameter, or if the reordering parameter of the PDCP layer is not configured, using a default value; or using a default value for the reordering parameter of the RLC layer, wherein the configured reordering parameter of the PDCP layer comprises at least one of the following: a reordering window, a reordering timer, or a sequence number (SN) space size; or
   if the configuration parameter of the PDCP layer does not comprise the reordering parameter of the PDCP layer, performing at least one of the following: determining to disable reordering for the PDCP layer; or determining to disable reordering for the RLC layer; or
   if the configuration parameter of the RLC layer comprises the reordering parameter of the RLC layer, performing at least one of the following: determining to enable reordering for the PDCP layer; determining to enable reordering for the RLC layer; if the reordering parameter of the RLC layer is configured, using the configured reordering parameter, or if the reordering parameter of the RLC layer is not configured, using a default value; or using a default value for the reordering parameter of the PDCP layer, wherein the configured reordering parameter of the RLC layer comprises at least one of the following: a reordering window, a reordering timer, or an SN space size; or
   if the configuration parameter of the RLC layer does not comprise the reordering parameter of the RLC layer, performing at least one of the following: determining to disable reordering for the PDCP layer; or determining to disable reordering for the RLC layer.

4. The method according to claim 2, further comprising one of the following:
   if the configuration information of the MBS service comprises a group of configuration parameters of the PDCP layer or a group of configuration parameters of the RLC layer, and the group of configuration parameters indicates that reordering is to be enabled, determining to enable reordering for both the PDCP layer and the RLC layer;
   if the configuration information of the MBS service comprises a group of configuration parameters of the PDCP layer or a group of configuration parameters of the RLC layer, and the group of configuration parameters indicates that reordering is to be disabled, determining to disable reordering for both the PDCP layer and the RLC layer; or
   if the configuration information of the MBS service comprises a group of configuration parameters of the PDCP layer or a group of configuration parameters of the RLC layer, determining to use the group of configuration parameters for one of the PDCP layer and the RLC layer and use default configuration parameters for the other.

5. The method according to claim 1, wherein the information for determining whether to enable reordering for the PDCP layer and/or the RLC layer comprises:

indication information, used to indicate whether to enable reordering for the PDCP layer and/or the RLC layer; and the method further comprises one of the following:

if the indication information indicates that reordering is to be disabled, using a first group of default configuration parameters for the PDCP layer and/or the RLC layer, wherein the first group of default configuration parameters comprises at least one of the following: a reordering window size is 0 or a reordering timer length is 0;

if the indication information indicates that reordering is to be enabled, using a second group of default configuration parameters for the PDCP layer and/or the RLC layer, wherein the second group of default configuration parameters comprises at least one of the following: a reordering window size is N1 or a reordering timer length is m1, wherein both N1 and m1 are non-zero positive values; or if the indication information indicates that reordering is to be enabled, using a third group of default configuration parameters for the PDCP layer, and using a fourth group of default configuration parameters for the RLC layer, wherein the third group of default configuration parameters comprises at least one of the following: a reordering window size is N2 or a reordering timer length is m2, and the fourth group of default configuration parameters comprises at least one of the following: a reordering window size is N3 or a reordering timer length is m3, wherein N2, m2, N3, and m3 are all non-zero positive values.

6. The method according to claim 1, wherein the information for determining whether to enable reordering for the PDCP layer and/or the RLC layer comprises:

first configuration information, used to implicitly indicate whether to enable reordering for the PDCP layer and/or the RLC layer, wherein the first configuration information comprises at least one of the following: a hybrid automatic repeat request (HARQ) feedback configuration parameter, a quality of service (QOS) related parameter, a block error rate, or whether to enable an in-order delivery function for a service layer; and the HARQ feedback configuration parameter comprises at least one of the following: whether the MBS service requires a HARQ feedback; or a parameter used for the HARQ feedback.

7. The method according to claim 6, wherein the first configuration information comprises the HARQ feedback configuration parameter; and the method further comprises one of the following:

if the MBS service does not require the HARQ feedback, determining at least one of the following: not requiring the PDCP layer; disabling reordering for the PDCP layer; disabling reordering for the RLC layer; or using a first group of default configuration parameters for the PDCP layer and/or the RLC layer, wherein the first group of default configuration parameters comprises at least one of the following: a reordering window size is 0 or a reordering timer length is 0;

if the MBS service requires the HARQ feedback, determining at least one of the following: requiring the PDCP layer; enabling reordering for the PDCP layer; enabling reordering for the RLC layer; or using a second group of default configuration parameters for the PDCP layer and/or the RLC layer, wherein the second group of default configuration parameters comprises at least one of the following: a reordering window size is N1 or a reordering timer length is m1, wherein both N1 and m1 are non-zero positive values;

if the MBS service requires the HARQ feedback, determining at least one of the following: requiring the PDCP layer; enabling reordering for the PDCP layer; enabling reordering for the RLC layer; or using a third group of default configuration parameters for the PDCP layer and using a fourth group of default configuration parameters for the RLC layer, wherein the third group of default configuration parameters comprises at least one of the following: a reordering window size is N2 or a reordering timer length is m2, and the fourth group of default configuration parameters comprises at least one of the following: a reordering window size is N3 or a reordering timer length is m3, wherein N2, m2, N3, and m3 are all non-zero positive values;

if the MBS service requires the HARQ feedback, and only one HARQ process is configured for the MBS service, or the network-side device explicitly or implicitly indicates that MBS data packets are not out of order, determining at least one of the following: not requiring the PDCP layer; disabling reordering for the PDCP layer; disabling reordering for the RLC layer; or using a first group of default configuration parameters for the PDCP layer and/or the RLC layer, wherein the first group of default configuration parameters comprises at least one of the following: a reordering window size is 0 or a reordering timer length is 0;

if the MBS service requires the HARQ feedback, and a plurality of HARQ processes are configured for the MBS service, or the network-side device explicitly or implicitly indicates that MBS data packets are out of order, determining at least one of the following: requiring the PDCP layer; enabling reordering for the PDCP layer; enabling reordering for the RLC layer; or using a second group of default configuration parameters for the PDCP layer and/or the RLC layer, wherein the second group of default configuration parameters comprises at least one of the following: a reordering window size is N1 or a reordering timer length is m1, wherein both N1 and m1 are non-zero positive values; or if the MBS service requires the HARQ feedback, and a plurality of HARQ processes are configured for the MBS service, or the network-side device explicitly or implicitly indicates that MBS data packets are out of order, determining at least one of the following: requiring the PDCP layer; enabling reordering for the PDCP layer; enabling reordering for the RLC layer; or using a third group of default configuration parameters for the PDCP layer and using a fourth group of default configuration parameters for the RLC layer, wherein the third group of default configuration parameters comprises at least one of the following: a reordering window size is N2 or a reordering timer length is m2, and the fourth group of default configuration parameters comprises at least one of the following: a reordering window size is N3 or a reordering timer length is m3, wherein N2, m2, N3, and m3 are all non-zero positive values.

8. The method according to claim 1, wherein the method further comprises one of the following:

not establishing the PDCP layer;

establishing the PDCP layer for which reordering is disabled; or establishing the PDCP layer for which reordering is enabled;

and/or wherein the method further comprises one of the following:

establishing the RLC layer for which reordering is enabled; or establishing the RLC layer for which reordering is disabled.

9. The method according to claim 8, wherein the establishing the PDCP layer for which reordering is disabled comprises at least one of the following:

setting initial values of all sequence number SN-related variables of the PDCP layer to 0, wherein the variable comprises at least one of the following: RX_NEXT, RX_DELIV, or RX_REORD;

setting a length of a reordering timer of the PDCP layer to 0; or setting a size of a reordering window of the PDCP layer to 0 or wherein the establishing the PDCP layer for which reordering is enabled comprises at least one of the following:

initializing an SN-related variable of the PDCP layer, wherein an initial value of the SN-related variable of the PDCP layer is calculated based on an SN of a first received data packet, and the variable comprises at least one of the following: RX_NEXT, RX_DELIV, or RX_REORD;

setting a length of a reordering timer of the PDCP layer to a non-zero positive value, wherein the non-zero positive value is configured by the configuration information of the MBS service or prescribed in a protocol; or setting a size of a reordering window of the PDCP layer to a non-zero positive value, wherein the non-zero positive value is configured by the configuration information of the MBS service or prescribed in a protocol.

10. The method according to claim 9, wherein an SN part of an initial value of RX_NEXT is equal to the SN of the first received data packet or SN+1 modulo SN space size, and a hyperframe number HFN part needs to ensure that RX_NEXT is positive;

an SN part of an initial value of RX_DELIV is equal to (SN of the first received data packet−0.5*reordering window size) modulo SN space size, and an HFN part needs to ensure that a count value is positive; and an initial value of RX_REORD is 0.

11. The method according to claim 8, wherein the establishing the RLC layer for which reordering is enabled comprises at least one of the following:

initializing an SN-related variable of the RLC layer, wherein an initial value of the SN-related variable of the RLC layer is calculated based on an RLC SN of a first received data packet, and the variable comprises at least one of the following: RX_Next_Reassembly, RX_Timer_Trigger, or RX_Next_Highest;

setting a length of a reordering timer of the RLC layer to a non-zero positive value, wherein the non-zero positive value is configured by the configuration information of the MBS service or prescribed in a protocol; or setting a size of a reordering window of the RLC layer to a non-zero positive value, wherein the non-zero positive value is configured by the configuration information of the MBS service or prescribed in a protocol;

wherein the establishing the RLC layer for which reordering is disabled comprises at least one of the following:

setting initial values of SN-related variables of the RLC layer to 0, wherein the variable comprises at least one of the following: RX_Next_Reassembly, RX_Timer_Trigger, or RX_Next_Highest;

setting a length of a reordering timer of the RLC layer to 0; or setting a size of a reordering window of the RLC layer to 0.

12. The method according to claim 11, wherein an initial value of RX_Next_Reassembly is set to the SN of the first received RLC PDU or SN+1 modulo SN space size;

an initial value of RX_Timer_Trigger is set to 0; or an initial value of RX_Next_Highest is set to the SN of the first received RLC PDU or SN+1 modulo SN space size.

13. The method according to claim 1, wherein the receiving the MBS service based on the configuration information of the MBS service comprises:

if reordering is configured as disabled for the PDCP layer, for each received data packet, directly obtaining an SDU through parsing and then delivering the SDU to a higher layer, and directly setting an SN part of a variable RX_NEXT or RX_DELIV of the PDCP layer to an SN of the received data packet or SN+1, and setting an HFN part to 0 or any other arbitrary or prescribed value that ensures that a count value is positive.

14. The method according to claim 1, wherein a multicast radio bearer (MRB) or a data radio bearer (DRB) is used to carry the MBS service; and the method further comprises:

if switching from an MRB to a DRB is required, receiving configuration information of the MBS service of the DRB, and establishing a new PDCP layer and/or RLC layer for the DRB based on the configuration information of the MBS service of the DRB;

or if switching from an MRB to a DRB is required, using a PDCP layer configuration and/or an RLC configuration of the MRB for the DRB;

or if switching from a DRB to an MRB is required, receiving configuration information of the MBS service of the MRB, and establishing a new PDCP layer and/or RLC layer for the MRB based on the configuration information of the MBS service of the MRB;

or if switching from a DRB to an MRB is required, using a PDCP layer configuration and/or an RLC configuration of the DRB for the MRB.

15. The method according to claim 14, wherein the configuration information of the MBS service of the MRB is configured in at least one of the following modes:

a system information block, system information, or a broadcast mode; or dedicated signaling.

16. A multicast service configuration method, performed by a network-side device and comprising:

sending configuration information of a multicast broadcast service (MBS) service to a terminal, wherein the configuration information of the MBS service comprises information for determining whether to enable reordering for a packet data convergence protocol (PDCP) layer and/or a radio link control (RLC) layer.

17. The method according to claim 16, wherein the configuration information of the MBS service is sent to the terminal in at least one of the following modes:
   a system information block, system information, or a broadcast mode;
   dedicated signaling; or
   preconfiguration information.

18. The method according to claim 16, wherein the information for determining whether to enable reordering for the PDCP layer and/or the RLC layer comprises at least one of the following:
   a configuration parameter of the PDCP layer, wherein the configuration parameter of the PDCP layer comprises at least one of the following: whether the PDCP layer is required;
   whether to enable reordering for the PDCP layer; or a reordering parameter of the PDCP layer;
   a configuration parameter of the RLC layer, wherein the configuration parameter of the RLC layer comprises at least one of the following: whether to enable reordering for the RLC layer; or a reordering parameter of the RLC layer;
   indication information, used to indicate whether to enable reordering for the PDCP layer and/or the RLC layer; or
   first configuration information, used to implicitly indicate determining whether to enable reordering for the PDCP layer and/or the RLC layer, wherein
   the first configuration information comprises at least one of the following: a hybrid automatic repeat request (HARQ) feedback configuration parameter, a quality of service (QOS) related parameter, a block error rate, or whether to enable an in-order delivery function for a service layer; and
   the HARQ feedback configuration parameter comprises at least one of the following: whether the MBS service requires a HARQ feedback; or a parameter used for the HARQ feedback.

19. A terminal, comprising a processor, a memory, and instructions stored in the memory and capable of running on the processor, wherein when the instructions are executed by the processor, steps of a multicast service receiving method are implemented, the steps comprises:
   receiving configuration information of a multicast broadcast service (MBS) service sent by a network-side device, wherein the configuration information of the MBS service comprises information for determining whether to enable reordering for a packet data convergence protocol (PDCP) layer and/or a radio link control (RLC) layer; and
   receiving the MBS service based on the configuration information of the MBS service.

20. A network-side device, comprising a processor, a memory, and instructions stored in the memory and capable of running on the processor, wherein when the instructions are executed by the processor, the steps of the multicast service configuration method according to claim 16 are implemented.

* * * * *